(12) United States Patent
Scobey et al.

(10) Patent No.: US 6,678,093 B1
(45) Date of Patent: Jan. 13, 2004

(54) OPTICALLY COUPLED ETALONS AND METHODS OF MAKING AND USING SAME

(75) Inventors: Michael A. Scobey, Santa Rosa, CA (US); Lucien P. Ghislain, San Rafael, CA (US); Dennis J. Derickson, Windsor, CA (US); Loren F. Stokes, Santa Rosa, CA (US)

(73) Assignee: Cierra Photonics, Inc., Santa Rosa, CA (US)

( * ) Notice: Subject to any disclaimer, the term of this patent is extended or adjusted under 35 U.S.C. 154(b) by 0 days.

(21) Appl. No.: 10/096,478

(22) Filed: Mar. 12, 2002

Related U.S. Application Data
(60) Provisional application No. 60/276,018, filed on Mar. 15, 2001.

(51) Int. Cl.[7] .............................................. G02B 27/00
(52) U.S. Cl. ..................... 359/578; 359/577; 359/584; 359/589; 356/454; 156/99
(58) Field of Search ................. 359/577, 584, 359/589, 588, 359, 578; 356/454, 519; 156/99, 101; 372/20

(56) References Cited

U.S. PATENT DOCUMENTS

| | | | | |
|---|---|---|---|---|
| 5,144,498 A | * | 9/1992 | Vincent ....................... 359/885 |
| 5,212,584 A | * | 5/1993 | Chung ......................... 359/260 |
| 5,283,845 A | | 2/1994 | Ip |
| 5,784,507 A | * | 7/1998 | Holm-Kennedy ............ 385/31 |
| 5,982,488 A | | 11/1999 | Shirasaki |
| 6,110,337 A | | 8/2000 | Sullivan et al. |
| 6,125,220 A | | 9/2000 | Copner et al. |
| 6,215,592 B1 | * | 4/2001 | Pelekhaty .................... 359/618 |
| 6,262,822 B1 | * | 7/2001 | Obhi ........................... 359/130 |
| 2002/0131047 A1 | * | 9/2002 | Zarrabian ................... 356/454 |

OTHER PUBLICATIONS

Hecht, Zajac, "Optics", Addison–Wesley, 1979, pp. 307.*

* cited by examiner

*Primary Examiner*—John Juba
*Assistant Examiner*—Leo Boutsikaris
(74) *Attorney, Agent, or Firm*—Banner & Witcoff, Ltd.

(57) ABSTRACT

Optical elements comprise stacked, optically matched and optically coupled etalons, at least one of the optically coupled etalons comprising first and second selectively transparent thin film mirror coatings on opposite surfaces of a bulk optic. The bulk optic defines the cavity spacing of the etalon and may, for example be formed of a monolithic body of silica or other optically transparent glass diced from a glass wafer. The bulk optic may further comprise a wedge coating of progressively increasing thickness overlying the monolithic glass body and compensating for, or offsetting non-parallelism of the bulk optic. The bulk optic may further comprise a thickness-adjustment layer of substantially uniform thickness. The disclosed optical elements optionally comprise other devices optically coupled to the stacked etalons. Novel methods are disclosed for producing the stacked etalons.

30 Claims, 16 Drawing Sheets

OPTICALLY COUPLED ETALONS AND METHODS OF MAKING AND USING SAME

PRIORITY APPLICATION

This application claims the benefit of U.S. Provisional Application No. 60/276,018 filed on Mar. 15, 2001 and titled "Optically Coupled Etalons and Methods of Making And Using Same."

CROSS-REFERENCED APPLICATIONS

This application is related to commonly assigned U.S. Provisional Application No. 60/275,939 filed on Mar. 15, 2001 and titled "Apparatus and Method for Vacuum Coating Deposition," U.S. Provisional Application No. 60/276,022 filed on Mar. 15, 2001 and titled "Optical Communication System Containing Interleaver and Methods of Making and Using Same," U.S. Provisional Application No. 60/275,918 filed on Mar. 15, 2001 and titled "Optical System With Cascaded Interleavers and Methods of Making and Using Same," U.S. Provisional Application No. 60/275,920 filed on Mar. 15, 2001 and titled "Iso-Optical Thermal Compensator and Methods of Making and Using Same," U.S. Provisional Application No. 60/275,998 filed on Mar. 15, 2001 and titled "Methods of Making Optical Etalons," U.S. Provisional Application No. 60/276,017 filed on Mar. 15, 2001 and titled "Optical System with Interleavers and Method of Making and Using Same," U.S. Provisional Application No. 60/275,997 filed on Mar. 15, 2001 and titled "Optical Filter Elements and Methods of Making and Using Same," U.S. Provisional Application No. 60/276,019 filed on Mar. 15, 2001 and titled "Optical Etalons and Methods of Making and Using Them," U.S. Provisional Application No. 60/276,020 filed on Mar. 15, 2001 and titled "Wafer Scale Production of Optical Elements," U.S. Provisional Application No. 60/276,023 filed on Mar. 15, 2001 and titled "Air Space Variable Optical Etalons and Methods of Making and Using Same," U.S. Provisional Application No. 60/275,945 filed on Mar. 15, 2001 and titled "Air Space Optical Etalons and Methods of Making and Using Same," and U.S. Provisional Application No. 60/276,316 filed on Mar. 16, 2001 and titled "Optical Monitoring of Thin Film Deposition Thickness," the entire disclosure of each of which is hereby incorporated herein by reference for all purposes.

INTRODUCTION

This invention relates to stacked, optically coupled etalons and to methods of making and using them, as well as to devices incorporating such stacked, optically coupled etalons.

BACKGROUND

Etalons are ubiquitous in optical systems, such as optical sensors, optical communication systems, etc. The basic Fabry-Perot etalon can be designed and produced to have a sharp response at resonant frequencies, which makes them suitable as optical filters such as bandpass filters. They also give a variable amount of dispersion, and so have been suggested for possible use as dispersion compensators. Thus Fabry-Perot etalons are a basic building block in a number of different optical elements, i.e., in optically functional components or devices. Such devices may be active or passive and may be employed in a system (or adapted to be employed in a system) to pass or transmit a selective wavelength or band of wavelengths or periodic set of wavelength bands. Exemplary optical elements in which etalons are used include optical sensors, and filters, e.g., band pass filters, single channel filters, and other wavelength selective filter devices such as wavelength division multiplexers, and dispersion compensators and other components of optical communication systems.

Etalons typically comprise precisely parallel selectively transmissive surfaces such as thin films, i.e., partially reflective mirrors or surfaces on opposite sides of an integral number of half waves distance or gap between them, forming the etalon's cavity. The thin film and cavity characteristics determine the optical properties of the etalon. That is, the spectral characteristics of the etalon are generally determined by the reflectivity of the mirrors or surfaces and by the optical thickness of the cavity length. Such etalons have long been produced, for example, by sputter deposition of film stacks of alternating layers of materials, i.e. a high refractive index material alternating with a low refractive index material, to form a mirror coating, which is transmissive of selected wavelengths.

Two such mirror coatings sandwich a sputter-deposited cavity layer between them. Sputtering or other physical vapor deposition of the relatively thick cavity layer is time consuming and, therefore adds substantial time and cost to the production of such etalons. The result is undesirably high cost for production for such etalons.

It has long been a recognized problem in this industry, that producing etalons having desired properties can be difficult and expensive. In addition, there are industry-recognized problems associated with producing structurally robust etalons having desired, precise optical properties. Prior known etalons have employed various designs, such as the etalons used in the interferometric optical devices of U.S. Pat. No. 6,125,220 to Copner et al. In the interleaver/de-interleaver devices of Copner et al, two glass interferometric end plates are separated by a spacer region where the etalon is formed. The spacer region is an air gap having a predetermined dimension. In adjustable Fabry-Perot devices, such as those disclosed in U.S. Pat. No. 5,283,845 to Ip, tuning of the center wavelength of the spectral passband of an etalon is achieved by varying the effective cavity length (spacing) between two end plates carrying thin film reflectors. More specifically, in Ip a piezo actuator is used, extending between the two end plates. By varying the electric power applied to the piezo actuator, the axial length of the actuator can be varied, and thus the gap between the end plates varied. As alternatives to piezo-electric actuators, the tuning mechanism may include liquid crystals, temperature, pressure, and other mechanisms. It is a disadvantage that adjustable etalons as in Ip involve considerable assembly complexity and cost. Also, maintaining strict parallelism between the end plates can present additional difficulties.

The prior known optical etalons, as noted above, fail to fully meet the needs of many applications, especially for optical elements intended for optical communication systems, precision sensors, etc.

It is an object of the present invention to provide stacked, optically coupled etalons addressing some of the deficiencies of the prior known technologies. It is a particular object of at least certain preferred embodiments, to provide stacked, optically coupled etalons and methods of making same, and optical elements incorporating such stacked, optically coupled etalons. Additional objects and aspects of the invention and of certain preferred embodiments of the invention will be apparent from the following disclosure and detailed description.

SUMMARY

In accordance with a first aspect, an optical element comprises multiple Fabry-Perot etalons stacked and optically coupled. The etalons may be placed in optical contact, i.e. the thin film coatings of an etalon in direct and substantially continuous surface-to-surface contact with the thin film coatings of an adjacent etalon in the stack, or may be placed in contact using one or more bonding layers optically coupled with each other between adjacent etalons.

As used herein, a bonding layer is any layer of bonding material on a surface of an etalon and used to physically attach that etalon to an adjacent etalon. The bonding layer optionally is in the light path through the stacked etalon and serves also to optically couple the adjacent etalon. In such embodiments, preferably the thickness of the bonding layer is equal to an odd number of quarter wavelength optical thickness (QWOTs). The bonding layer may comprise any of numerous materials suitable for bonding etalons together including, but not limited to adhesives, fritted glass, etc, or other suitable materials. In other embodiments, the bonding layer is omitted and optical contacting is used to attach an etalon to an adjacent etalon. Optical contacting can result in optically zero thickness, e.g. near zero thickness or approximately zero QWOTs, between adjacent etalons.

In accordance with another aspect, one or more etalons of the stacked, optically coupled etalons, preferably each etalon, comprises a bulk optic having first and second parallel, selectively transparent surfaces. The bulk optic comprises a solid optically transparent body (at the wavelengths of interest) and optionally comprises a wedge correcting coating (referred to here generally as a "wedge coating") and/or a thickness-adjustment layer on at least one of the two surfaces of the optically transparent body. The wedge coating, further described below, establishes high precision parallelism of the selectively transparent surfaces of the etalon. The thickness of the bulk optic (including any wedge coating), i.e., the dimension between the selectively transparent, parallel surfaces, defines the cavity spacing. Preferably, the bulk optic, including the wedge coating, will typically have an optical thickness equal to an integral number of half waves for the wavelength of interest. In preferred embodiments the selectively transparent surfaces are thin film mirror coatings comprising, for example, a film stack of alternating high and low refractive index oxides or a metal thin film in accordance with known thin film technologies. Preferably, the thin film coatings comprise a continuous uniform thickness metal film.

If a wedge coating is used, the thickness of the wedge coating varies progressively across the etalon. That is, the thickness of the wedge coating, viewed in cross-section in at least one plane orthogonal to the parallel, selectively transparent surfaces of the etalon, has a thickness that increases (or decreases in the opposite direction) continuously, typically approximately linearly, to compensate for non-parallelism, or "wedge", in the underlying body of the bulk optic. As described further below, the bulk optic can be diced from a wafer on which a wedge coating and the two thin film coatings have been deposited by magnetron sputtering, ion beam sputtering or other known deposition techniques. Preferably, surface polishing is performed to first polish the wafer, for example, a silica wafer suitable for optical filter production, to parallelism within 1 to 2 arc seconds and wavefront error of less than $\frac{1}{50}$ (2.0%) of a wave at the wavelength of interest. For an etalon intended for use as one of multiple stacked etalons in an optical element in an optical telecommunication system, the wavefront error will preferably be less than $\frac{1}{50}$ of a wave at 1550 nm. Low wavefront error can be understood in this context to mean that the thickness of the bulk optic, i.e., the distance between the two opposite surfaces of the bulk optic, is substantially linearly variable and, hence, controllable or correctable by a wedge coating in accordance with the present disclosure. Preferably, for stacked, optically coupled etalons suitable for use in optical communication elements, the wedge coating brings parallelism of the opposite surfaces of each bulk optic body from the 1 to 2 arc seconds of wedge mentioned above to less than 0.1 arc seconds, most preferably less than 0.01 arc seconds.

It is a significant advantage that each etalon of the stacked, optically coupled etalons disclosed here can employ a bulk optic, comprising the optically transparent body and the wedge coating, to define the cavity spacing of the etalon. Substantial cost savings and production simplification can be realized in accordance with at least certain preferred embodiments of the stacked, optically coupled etalons. Further, robust and accurate stacked, optically coupled etalons can be achieved using production techniques whose application will be readily understood by those skilled in the art given the benefit of this disclosure.

In accordance with a method aspect of the present disclosure, the wedge coating is deposited onto the optically transparent body of the bulk optic by physical vapor deposition, e.g. magnetron sputtering or ion beam sputtering in a vacuum chamber, with the bulk optic (alone or as part of a larger substrate, such as a typical 6 inch or larger substrate wafer used in the production of optical filters) not spinning during deposition. Preferably the coating is a low defect coating to allow optical contact bonding or other optical coupling of the stacked etalons. Deposition can be otherwise in accordance with known techniques, whose applicability and manner of implementation will be within the ability of those skilled in the art given the benefit of this disclosure. The substrate is oriented at an angle to the target or otherwise arranged to receive progressively different deposition rates from one edge to the opposite edge. The target is preferably an elongate source to provide a coating with a roughly linear profile. Preferably, the target is tangential to the circumference of the substrate and is about four times as large as the substrate, e.g. for a 6 inch diameter substrate the target can be about 20 inches long. The thinnest point of the substrate is positioned closest to the target or otherwise oriented or favored to have the fastest rate of deposition. Conversely, the thickest point is positioned or oriented to have the lowest deposition rate. Thus, the sputtered material will deposit fastest and, therefore, the most heavily, i.e., the thickest, where the bulk optic was thinnest, with progressively thinner deposition toward the area where the least was wanted. Since the substrate is not spinning and is oriented or arranged as just described, the thickness of the resulting wedge coating will change progressively (hence the term "wedge"), with the change in the thickness of the wedge coating being opposite that of the underlying body. The net effect is that the thickness of the bulk optic is substantially uniform over all or a large portion of its area. Where the bulk optic is prepared in the form of a typical substrate wafer, thin films can then be deposited to complete the etalon (subject to any further production or packaging steps etc.) in the same or a different sputter deposition chamber. Deposition of a wedge coating and thin films on another, second surface of the bulk optic may be performed in accordance with the embodiments described here.

In accordance with another aspect, one or more of the etalons contained within stacked, optically coupled etalons, most preferably all of the stacked etalons, each comprises a thickness-adjustment layer of substantially uniform thickness on at least one of the two surfaces of the optically transparent body. As used herein, substantially uniform thickness means the thickness of the layer across the surface of the bulk optic is approximately constant. The thickness-adjustment layer, further described below, establishes the desired thickness of the bulk optic cavity of the etalon. The bulk optic is a solid, optically transparent (at the wavelengths of interest) body whose thickness, i.e. the dimension between the selectively transparent, parallel surfaces, including the thickness-adjustment layer, defines the cavity spacing. In particular, the bulk optic, including the thickness-adjustment layer, will typically have an optical thickness equal to an integral number of half waves at the same or all points for the wavelength(s) of interest. In preferred embodiments, the selectively transparent surfaces are Fabry-Perot thin film coatings comprising, for example, a film stack of alternating high and low refractive index oxides or a metal thin film in accordance with known thin film technologies. As described further below, the bulk optic can be diced from a wafer on which a thickness-adjustment layer and the two Fabry-Perot thin film coatings have been deposited by magnetron sputtering, ion beam sputtering, or other known deposition techniques. Preferably, surface polishing is performed to first polish the wafer, for example, a silica wafer suitable for optical filter production, to parallelism within 1 to 2 arc seconds and wavefront error of less than $\frac{1}{50}$ (2.0%) of a wave at the wavelength of interest. For stacked, optically coupled etalons intended for use as one of a plurality of stacked etalons in an optical element in an optical telecommunication system, the wavefront error will preferably be less than $\frac{1}{50}$ of a wave at 1550 nm.

It is a significant advantage that the etalons of the stacked, optically coupled etalons disclosed here can employ a bulk optic, comprising the optically transparent body and the thickness-adjustment layer, to define the cavity spacing of the etalon. Substantial cost savings and production simplification can be realized in accordance with at least certain preferred embodiments of the stacked, optically coupled etalons. Further, robust and accurate stacked, optically coupled etalons can be achieved using production techniques whose application will be readily understood by those skilled in the art given the benefit of this disclosure.

In accordance with a method aspect of the present disclosure, the thickness adjustment layer is deposited onto the optically transparent body of the bulk optic by physical vapor deposition, e.g. magnetron or ion beam sputtering in a vacuum chamber, with the bulk optic (alone or as part of a larger substrate, such as a typical 6 inch or larger substrate wafer used in the production of optical filters) spinning during deposition in accordance with known techniques. Preferably the coating is a low defect coating to allow optical contact bonding or other optical coupling of the stacked etalons. Deposition can be otherwise in accordance with known techniques, whose applicability and manner of implementation will be within the ability of those skilled in the art given the benefit of this disclosure. The net effect is that the thickness of the bulk optic is substantially uniform over all or a large portion of its area. Where the bulk optic is prepared in the form of a typical substrate wafer, thin films can then be deposited to complete the etalon (subject to any further production or packaging steps etc.) in the same or a different sputter deposition chamber. From the disclosure above of optical elements comprising a bulk optic and a wedge coating as the cavity of the optical element, it will be apparent to those skilled in the art that embodiments of the present invention comprising a bulk optic with a thickness adjustment layer and no wedge coating can be expected to have non-parallel surfaces carrying the optical thin films. The consequent impact on optical properties of the optical element may be addressed in accordance with suitable techniques, such as tilting of the optical element in use. Selected area of the optical element may provide optical properties meeting product specification for an intended application.

In accordance with another aspect, each etalon of the stacked, optically coupled etalons, in accordance with the above disclosure, further comprises a wedge coating and a thickness-adjustment layer. As noted above, the properties of an etalon will depend, in part, on the cavity spacing. Thus, in accordance with certain preferred embodiments, the thickness of the bulk optic is adjusted, typically after deposition of the wedge coating, by follow-on deposition of a thickness-adjustment layer. In accordance with a further method aspect of the present disclosure, the thickness-adjustment layer is deposited by physical vapor deposition, most preferably magnetron sputtering or ion beam sputtering in a vacuum chamber, with the bulk optic (alone or as part of a larger substrate, such as a typical substrate wafer used in the production of optical filters) spinning during deposition in accordance with known techniques. In accordance with certain highly preferred embodiments, the wedge coating and then the thickness-adjustment layer are deposited onto the bulk optic (again, either alone or as part of a larger substrate) in a single continuous step. The wedge coating is deposited as described above, by deposition onto the bulk optic substrate not spinning in the vacuum chamber. Upon completion of the wedge coating, the bulk optic substrate is caused to commence spinning without interruption in deposition. Deposition is, therefore, continuous for the wedge coating and the thickness-adjustment layer. To control the optical thickness of the cavity formed by the bulk optic, the thickness can be precisely monitored during deposition of the thickness-adjustment layer. Given the benefit of this disclosure, it will be within the ability of those skilled in the art to employ suitable techniques for monitoring and controlling the thickness of the bulk optic as the thickness-adjustment layer is being deposited. Suitable optical monitoring techniques are known, including, for example, that disclosed in U.S. Pat. No. 6,110,337 to Sullivan et al., entitled *Sputtering Method and Apparatus with Optical Monitoring*, the entire disclosure of which is hereby incorporated by reference.

In accordance with another aspect, additional cavities can be deposited on either surface of a bulk optic etalon, suitable for use in stacked, optically coupled etalons, by suitable deposition techniques, such as, for example, ion beam sputtering, magnetron sputtering, etc. That is, additional cavities can be formed on the bulk optic etalon. More specifically, following deposition of a suitable transition layer overlying the thin film stacks on either surface of the bulk optic etalon, a cavity can be deposited by, for example, sputtering a first suitable thin film coating or stack, such as a sequence of alternating H/L/H film, followed by deposition of a cavity film, followed by deposition of a second thin film coating or stack which preferably is substantially identical to the first thin film coating. Similarly, yet one or more such thin film etalons can be deposited thereafter employing suitable odd QWOT transition layers between, in accordance with thin film principles well known to those skilled in the art. Thus, the advantage of improved optical performance characteristics of a multi-cavity device can be achieved, incorporating a bulk optic etalon of the type disclosed above together with additional thin film etalons unitary therewith by depositing such thin film etalons thereon using sputtering or other suitable deposition techniques. Any suitable materials disclosed above, and other suitable materials known to those skilled in the art, may be used for the thin films of the thin film etalons including but not limited to $Ta_2O_5$, $ZrO_2$, $TiO_2$, $Al_2O_5$, $SiO_2$, and MgF. The multi-cavity deposition product, described above, is suitable for use, generally together with or in place of the single cavity embodiments of the bulk optic etalons disclosed here.

In accordance with certain embodiments as disclosed above, the stacked, optically coupled etalons described above may be bonded to each other. Each etalon comprises any or all of the components listed above including, but not limited to, a bulk optic, optionally comprising a wedge coating and/or a thickness-adjustment layer, and thin film mirror coatings on the surfaces of the bulk optic. Between adjacent etalons may be a layer of bonding material that acts to optically couple the etalons together. The thickness of the bonding layer is preferably equal to an odd number of QWOTS. This bonding layer may comprise an adhesive, such as an epoxy, e.g. the epoxies available from Epoxy Technology, Billerica, Mass., such as EPO-TEK 353 ND, an adhesive optionally having a monolayer of small beads embedded in the adhesive to facilitate precise spacing of the adjacent etalons, fritted glass or any other composition or material that may be deposited to an odd number of QWOTs and is capable of bonding the etalons together.

In accordance with another aspect, a method for production of the stacked, optically coupled etalons is disclosed. Each etalon may comprise the components discussed above, including but not limited to, a bulk optic, optionally comprising a wedge coating and/or a thickness-adjustment layer, and thin film coatings on the surfaces of the bulk optic. In accordance with preferred embodiments, multiple etalons can be formed simultaneously be depositing thin film mirror coatings onto both planar surfaces of a planar wafer formed of silica, or any other suitable optical glass or suitable optical material. Such deposition preferably is by physical vapor deposition, as disclosed above. Optionally, the wafer is first planarized and coated with a wedge coating and/or a thickness-adjustment layer. After a selectively transparent thin film mirror coating is deposited on each side of the wafer, the wafer can be cut or diced into multiple smaller pieces, some or all of which will be functional as an etalon for a particular wavelength. Optically matched etalons can then be stacked and joined as disclosed above. Alternatively, one such wafer can be joined to a second such wafer, wherein at least in some overlying areas the wafers are optically matched to each other. Two or more wafers can be stacked and joined in this manner. The stacked wafers are then cut or diced to provide multiple functional units of stacked, optically coupled etalons. Optionally, prior to dicing the wafer into individual etalons or into intermediate size "coupons" or the like, a bonding or joining material can be deposited onto one or both sides. Preferably such deposition is by sputter deposition, or other physical vapor deposition method, using optical monitoring to achieve proper thickness. Typically, the thickness of the joining or bonding layer will be an odd number (i.e. an odd integer) of QWOTs. In certain preferred embodiments further discussed below, the bonding layer will remain in the light path between adjacent etalons. In such embodiments, the bonding layer is formed of optically transparent material. In certain preferred embodiments, the bonding layer is selectively removed from the light path, e.g., by chemical etching, leaving an annulus or multiple discrete "feet" to serve as stand-offs between adjacent etalons. In such embodiments the material used to form the "feet" need not be optically transparent.

In accordance with certain preferred embodiments, the etalons are joined by depositing an optically transparent flitted glass layer on a surface of etalons. The fritted glass is preferably deposited using a vapor deposition process to a controlled thickness. The fritted glass layer may be deposited onto substrate wafers as disclosed above or onto individual etalons. Two or more wafers can be stacked or, alternatively, individual coupons or individual etalons can be stacked after being coated with fritted glass. After being placed in physical contact, the etalons are heated to the melting or softening point of the fritted glass, bonding the stacked etalons together. Preferably, after the etalons are joined, the thickness of the fritted glass layer between them is equal to an odd number of QWOTs. One skilled in the art will recognize, given the benefit of this disclosure, that this process may be repeated using additional etalons to increase the number of etalons that are joined and stacked.

In accordance with certain preferred embodiments, the etalons are joined using "feet." As used herein, "feet" are projections from opposite surfaces of adjacent etalons. "Feet" can be formed of fritted glass or other suitable materials able to provide a structurally stable stacking of the adjacent etalons to each other. After adjacent etalons are positioned in contact, heat can be applied to sufficiently melt or soften the "feet" so as to join the etalons to each other. Preferably, after joining the etalons, the distance between the etalon surfaces is equal to an odd number of QWOTs.

In accordance with certain preferred embodiments, adjacent etalons are joined using a layer of epoxy or other suitable adhesive. The adhesive can be applied using any suitable technique. The adhesive may be deposited onto wafers, coupons, or onto individual etalons. Two or more wafers, two or more coupons, or individual etalons are stacked in physical contact after the adhesive is applied. After being placed in physical contact, the adhesive layer bonds the etalons forming stacked, optically coupled etalons. Preferably, after the etalons are joined, the thickness of the epoxy layer is equal to an odd number of QWOTs. One skilled in the art will recognize, given the benefit of this disclosure, that this process may be repeated using additional etalons to increase the number of etalons that are coupled and stacked. In accordance with certain preferred embodiments, the etalons are joined using adhesive comprising optically transparent beads sized to function as a monolayer to assure a controlled spacing between the etalons. The small bead/adhesive mixture may be deposited onto wafers, coupons or onto individual etalons. Wafers, coupons, or etalons are placed in physical contact after being coated with the bead/adhesive mixture. After being placed in physical contact, the bead/adhesive mixture bonds the etalons forming stacked, optically coupled etalons having a uniform separation. Preferably, after the etalons are joined together, the thickness of the bead/adhesive layer is equal to an odd number of QWOTs. One skilled in the art will recognize, given the benefit of this disclosure, that this process may be repeated using additional etalons to increase the number of etalons that are coupled and stacked.

In accordance with preferred embodiments, the etalons may be coupled together using optical contact. To accomplish optical contact bonding, adjacent etalons are placed in physical contact with each other. Etalons are prepared as described above. The etalons are then placed into physical contact and, while not wishing to be bound by theory, it is presently understood that adjacent etalons in optical contact with each other are held together by electrostatic forces between the contacting surfaces of the etalons. Therefore, after optical contacting adjacent etalons there is approximately near zero thickness between the adjacent etalons, e.g. near zero QWOTs. For certain preferred embodiments, the selectively transparent thin film mirror coatings of the stacked etalons are formed of alternating films of high refractive index material and low refractive index material. Preferably, the outermost film of the mirror coating of one etalon is the same (i.e., either low or more preferably high refractive index) as the outermost film of the mirror coating of the adjacent etalon. The transition layer between them preferably has the opposite refractive index. Thus, if the two outermost films facing each other are high refractive index, then an air spacer or other low refractive index material preferably fills the odd QWOT space between the two etalons. Likewise, if the mirror coatings finish with low refractive index materials, then the joining transition layer between the two etalons should have a high refractive index.

Alternatively, the thickness of the outermost layer of the thin films may be reduced such that, when combined together they form a joining transition layer of refractive index opposite to that of the next film on either side. In other preferred embodiments, the etalons may be held in a stacked position using a coupling member such as a metal jacket a sleeve, etc. Should a coupling member be used, any space that exists between the etalon surfaces is preferably equal to an odd number of QWOTs and may be filled with air or other suitable materials.

In accordance with another aspect, the stacked and optically coupled etalons disclosed here may be incorporated into optical systems. The stacked, optically coupled etalons can be directly optically coupled, as the term is used here, when they are optically coupled, i.e. are in the same optical path, and furthermore are in optical contact or are otherwise in physical contact with each other and/or mounted to each other (e.g. by bonding material in or out of the optical path) or mounted together in the same housing or by the same fixture. An air space may be separating the stacked, optically coupled etalons or the stacked, optically coupled etalons may be in direct surface-to-surface contact. Similarly, optical components in an optical system comprising the stacked, optically coupled etalons disclosed here, that are directly optically coupled in accordance with the present disclosure, preferably have no intervening optical components performing substantial channel filtering or like optical operation on any passed signals. In particular, any signals passed by the stacked, optically coupled etalons, or other optical components in the optical system, arrive at a second etalon or second stacked, optically coupled etalons, or other optical component, without any intervening wavelength filtering optical operations to add or drop passbands or like operations. One skilled in the art, given the benefit of this disclosure, will be able to design and assemble optical system comprising directly optically coupled and stacked, optically coupled etalons and other optical components described here.

Optical elements comprising stacked, optically coupled etalons as disclosed above and the methods disclosed for their production will be recognized by those skilled in the art to represent a significant technological advance. Robust stacked, optically coupled etalons can be produced meeting precise optical performance characteristics, with advantageously low production costs and good production flexibility. In preferred embodiments, the stacked, optically coupled etalons have the advantageous attributes of small size, simple and potentially inexpensive construction, and good optical performance, including low loss, low polarization dependent loss and polarization mode dispersion, and low chromatic dispersion. Additional features and advantages will be understood from the following detailed description of certain preferred embodiments.

BRIEF DESCRIPTION OF THE DRAWINGS

Certain preferred embodiments of the invention will be described below with reference to the attached drawings in which.

Figure 1:
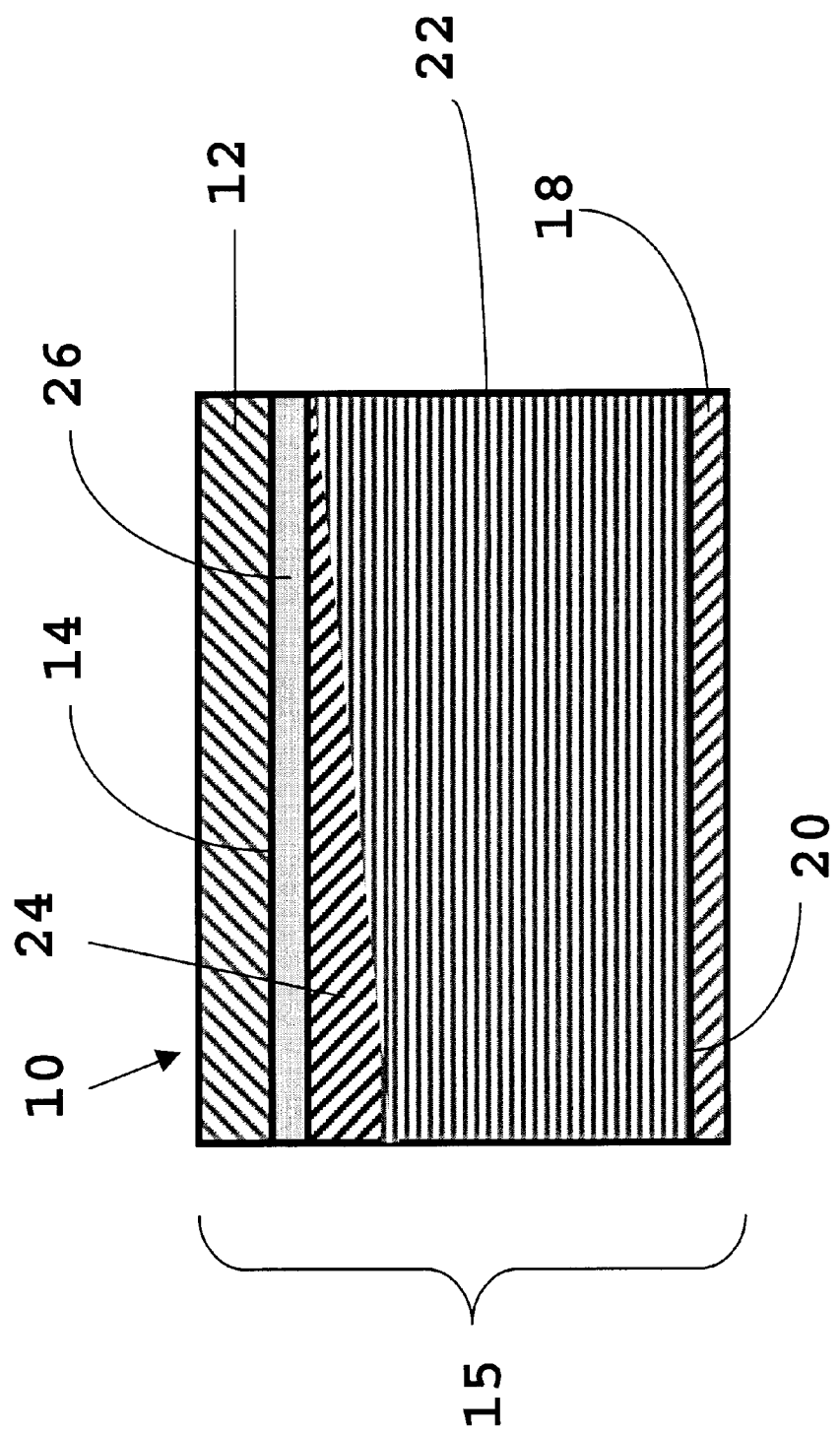
FIG. 1 is a schematic section view of an etalon suitable for use in the stacked, optically coupled etalons according to one preferred embodiment.

It will be apparent that the etalons and stacked, optically coupled etalons shown in FIGS. 1–16 are not necessarily to scale. Certain dimensions, such as the thickness of thin film coatings, may have been enlarged relative to other dimensions, such as the thickness of the bulk optic, for clarity of illustration and ease of understanding. Directional references used in this disclosure and detailed description, and in the claims, refer to the orientation shown in FIG. 1 unless otherwise clear from context. It will be understood by those skilled in the art, that the devices disclosed here can be used generally in any orientation relative to gravity and/or other components to which they might be optically and/or physically coupled, e.g., by optical fiber or the like.

DETAILED DESCRIPTION OF CERTAIN PREFERRED EMBODIMENTS

It will be recognized from the above, that the novel etalons employed in the stacked, optically coupled etalons disclosed here, i.e. in the stacked optically matched and optically coupled etalons, can be formed in innumerable different configurations and sizes. The precise size and configuration of the etalons used in the stacked, optically coupled etalons, including the choice of materials, design of the thin films, cavity spacing and the like will depend in large part on the particular application and use environment for which it is intended and its desired optical properties and performance characteristics. For convenience in this more detailed description of certain preferred embodiments, the etalons and the stacked, optically coupled etalons will generally be of a type suitable for use in optical elements of a fiberoptic telecommunication system. It will be within the ability of those skilled in the art, however, given the benefit of this disclosure, to select suitable materials and designs, as well as manufacturing techniques, for production of etalons and stacked, optically coupled etalons in accordance with the principles of the present invention, suitable for these and other types of applications.

The preferred embodiments of the etalons and stacked, optically coupled etalons disclosed here comprise first and second thin film coatings on parallel opposite sides of a cavity formed by a bulk optic comprising a solid, optically transparent body and a wedge coating on a surface of the optically transparent body. The wedge coating underlies the first thin film coating and the axial dimension of the bulk optic, i.e., the optical thickness dimension of the bulk optic in the direction of light passage through the etalon, defines the cavity spacing of the etalon. As used here the term "bulk optic" refers to a component of the etalons disclosed above comprising a solid, optically transparent body, such as a portion of an optically transparent wafer diced into multiple pieces after being coated, together with the wedge coating and/or thickness-adjustment layer. The solid, optically transparent body is an optically transparent substrate having first and second generally flat surfaces on opposite sides, which is self-supporting in the sense that it does not require an underlying support member to retain its shape and integrity during handling, packaging and transport in manners typical for optical elements intended for use as sensors, fiber optic communication system components or the like. Most preferably the transparent body of the bulk optic is a monolithic body, that is, a one-piece, self-supporting and unitary body of material. The transparent body of the bulk optic typically will comprise a portion of an optically transparent wafer. The wedge coating overlies a surface of the transparent body of the bulk optic, and there may or may not be a visible or discernable seam or interface between them. In certain preferred embodiments the wedge coating and thickness adjustment layer are formed of material that is the same as that of the transparent body. In other preferred embodiments, the wedge coating and/or thickness-adjustment layer are formed of a material comprising substantially the same refractive index as the material comprising the optically transparent body, e.g. the refractive indices differ by less than about ±0.01. It may, therefore, be difficult or impossible to see the boundaries between the transparent body, and the added wedge coating and thickness-adjustment layer. It is, of course, desirable generally that there be no or substantially no optical effect at such boundaries which would adversely impact the performance of the etalon. Thus, the wedge coating and thickness-adjustment coating may be difficult or even impossible to distinguish from the material of the underlying optically transparent body, at least without observing the manner in which the etalon was produced. This typically will not be the case where different materials are used for the optically transparent body, wedge coating and thickness-adjustment coating. In any event, these components of the bulk optic are distinct from each other in the function they perform and in their position in the bulk optic.

As discussed further below, the substrate piece forming the body of the etalon preferably is one of many diced from a substantially planar substrate, e.g., a glass, indium phosphide, silica or silicon wafer. Other suitable materials and glasses will be apparent to those skilled in the art given the benefit of this disclosure. Dicing can occur after the wafer has received a wedge coating, a thickness-adjustment layer and the thin film coatings by physical vapor deposition, preferably sputter deposition. Thus, in these preferred embodiments the substrate piece forming the body of the etalon, or the body of each etalon in the stacked, optically coupled etalons, is diced from a larger body sufficiently self-supporting as to be suitable for mounting (with and without spinning) in a vacuum deposition chamber for depositing optically functional coatings or film stacks on one or both sides. The bulk optic component of the etalons disclosed here, in accordance with preferred embodiments, typically is a very small piece of such a wafer. While the wafer often is 4–12 inches in diameter or larger, the coated parallel surfaces of the bulk optic or finished etalon diced from the wafer will generally be in the size range of 0.5 to 5.0 mm across their largest dimension. Thus, numerous etalons can be obtained from each wafer.

Referring now to FIG. 1, an etalon 10 is seen to comprise a first thin film mirror coating 12 on surface 14 of bulk optic 15 which forms the etalon's cavity. Second selectively transparent thin film mirror 18 is deposited on parallel opposite surface 20 of the bulk optic. The two thin film mirror coatings 12 and 18 are shown as metal mono-layers, preferably identical layers. They are designed in accordance with known parameters to be selectively transparent to the wavelength(s) required by the intended use or application of the finished etalon or stacked, optically coupled etalons. In certain embodiments, light that is incident on the selectively transparent surfaces of the stacked, optically coupled etalons has an angle of incidence preferably $\leq 1°$. One skilled in the art, given the benefit of this disclosure will be able to select an angle of incidence suitable for intended use and applications. Suitable fittings for launching light include, for example, a dual fiber collimator, a pair of single fiber collimators, an optical circulator, a 50/50 splitter used with a single fiber collimator, a fiber pigtail and the like. It will be within the ability of those skilled in the art to employ suitable end fittings to optically launch optical signals into the stacked, optically coupled etalons disclosed here. In certain embodiments the light is launched from an optical device, such as for example, a laser, collimator, drum lens, ball lens, grin lens, etc. One skilled in the art, given the benefit of this disclosure, will be able to select suitable optical devices for launching light. The bulk optic 15 comprises a solid, optically transparent body 22, wedge coating 24 overlying the optically transparent body, and thickness-adjustment layer 26 sandwiched between the wedge coating 24 and the thin film 12. The axial dimension of the bulk optic, i.e., the dimension of the bulk optic in the direction of light passage, defines the cavity spacing of the etalon. The precise optical thickness of the bulk optic will be adjusted slightly to compensate for the non-zero thickness of the metal films to preserve or optimize transparency at the precise wavelength(s) of interest. The optically transparent body 22 preferably is a monolithic body formed of silica or other suitable glass. The wedge coating and the thickness-adjustment layer each preferably is a layer of silica, glass, etc., most preferably being formed of the same material as the optically transparent body 22. Other suitable materials will be readily apparent to those skilled in the art given the benefit of this disclosure.

Wedge coating 24 can be seen in FIG. 1 to have a progressively increasing axial dimension from right to left in the cross-sectional view of FIG. 1. In a typical embodiment, the cross-sectional view obtained by cutting in a plane perpendicular to the plane of the paper in FIG. 1 would show a substantially constant axial dimension for the wedge layer. The combined thickness of wedge coating 24 and optically transparent body 22 is substantially constant over at least a large (i.e., sufficiently large for the intended use of the etalon) area of the etalon. Such parallelism is achieved in accordance with preferred embodiments through a combination of substrate polishing and the wedge coating. An optical wafer suitable for mounting in a sputtering chamber is subjected to a polishing process in accordance with known techniques and commercially available equipment. Such polishing processes typically produce finished substrates to within 2 arc seconds, preferably 1 to 2 arc seconds of wedge (shown exaggerated in FIGS. 1 and 2) and a wavefront error of less than 1/50 of a wave at 1550 nm. Low wavefront error will be understood in this context to mean that the thickness variation across the substrate is controlled by (i.e., essentially due to) the wedge. A wedge coating is then formed on one or both surfaces of the substrate to compensate for, that is, to offset, the wedge; net wedge after the wedge coating can be reduced to less than 0.1 arc second, less than 0.01 in preferred embodiments. The wedge coating can be formed by physical vapor deposition technique, such as magnetron sputtering, ion beam sputtering, or other sputtering method. Preferably the wedge coating is deposited on the optically transparent body by sputter deposition from a source in a vacuum chamber, the optically transparent body being mounted within the vacuum chamber without spinning during deposition and asymmetrical to the source. That is, in accordance with certain preferred embodiments, the substrate wafer is mounted in the vacuum chamber with no spinning and offset at an angle to the target or source. The thinner portion of the substrate is placed closest to the target to receive the highest rate of deposition. The thickest portion is furthest from the target. In preferred embodiments, the wedge coating is deposited so that the thickness of the wedge coating at its thickest point is less than about 1 micron and more preferably less than about 100 nm. Alternatively or in addition, shielding or other techniques can be used to achieve differential deposition rate across the substrate wafer. It will be within the ability of those skilled in the art to determine the proper distance and angle of offset to obtain good yield of wafer surface area having substantially uniform thickness. In that regard, substantially uniform, as that term is used here, means that the thickness of the wafer, including the bulk optic plus the wedge-correction layer, is sufficiently uniform over an area the size of a chip or segment to be cut later from the wafer, most preferably a large number of such chips or segments, to provide satisfactory optical precision in or as an etalon. Similarly, the precision of the thickness of the bulk optic with the thickness-adjustment layer added during thickness correction must be sufficient to provide satisfactory optical precision in the functioning of the etalon.

Figure 2B:
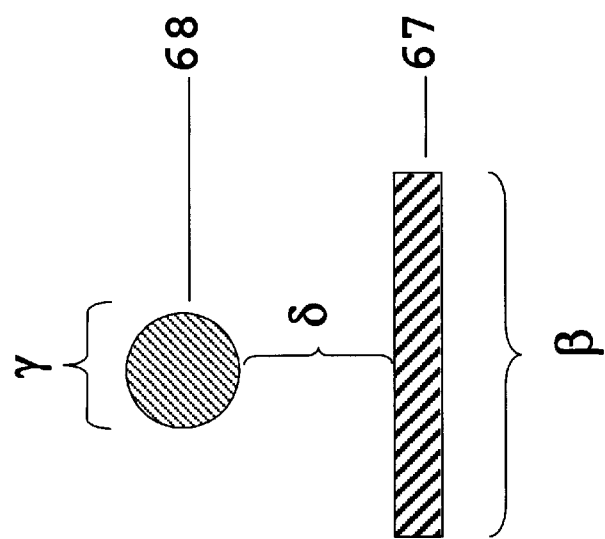
FIG. 2a is a schematic section view and FIG. 2b is a frontal view of a substrate positioned within a deposition chamber.
Figure 2A:
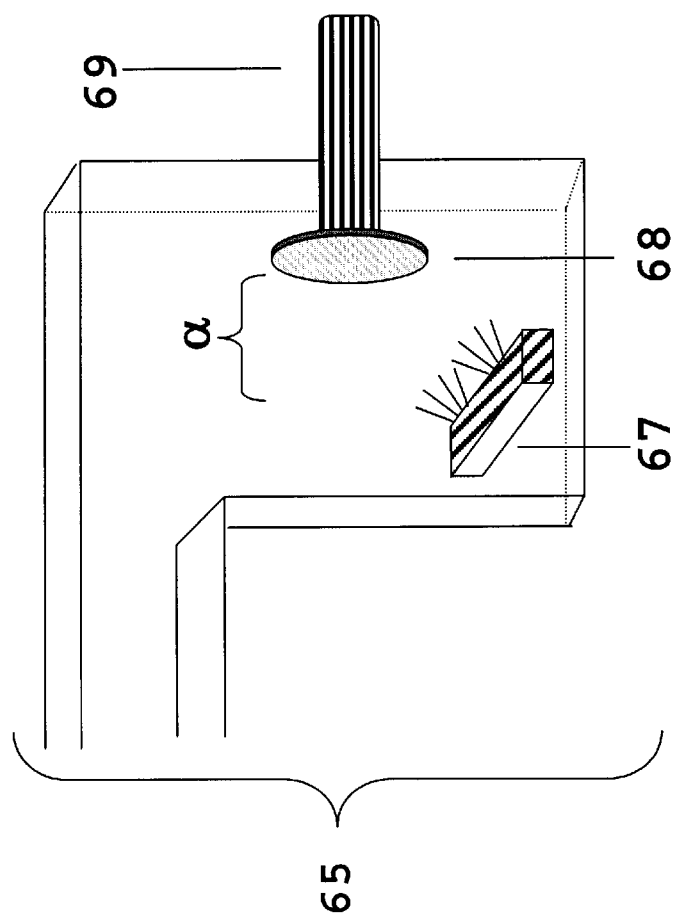

It will be within the ability of those skilled in the art, given the benefit of this disclosure, to select or empirically determine suitable orientations and positions of the substrate within a deposition chamber to achieve suitable deposition of wedge coating onto the substrate. Referring to FIGS. 2*a* and 2*b*, an embodiment of a chamber suitable for depositing a wedge coating onto a substrate is shown. The chamber 65 comprises an elongate source or target 67, e.g. a rectangular source, and a substrate 68, for receiving a wedge coating, which is held in place by device 69. In preferred embodiments, the length $\beta$ of target 67 is about three times larger than the diameter $\gamma$, or other length as the case may be, of the substrate 68. Target 67 may be positioned at distances $\alpha$ and $\delta$ from substrate 68. One skilled in the art, given the benefit of this disclosure, will be able to select or empirically determine dimensions for $\alpha$ and $\delta$ to achieve suitable deposition of wedge coating onto the substrate. The wedge coating is typically deposited without spinning substrate 68 and substrate 68 is positioned in the chamber so that the thinner portion of the substrate is placed closest to target 67 to receive the highest rate of deposition.

Total coating thickness to substantially eliminate a 1 arc second wedge is typically about 4–8 quarter waves (of the intended light wavelength that the etalon will be used with) depending on source geometry. Preferably the coating is controlled by optical monitoring, most preferably monitoring of two points on the wafer substrate during deposition. Coating can be halted when the thickness is the same at the two points along the direction of wedge. It should be noted that for clarity of explanation, the optically transparent body is still treated here as having its original wedge; the bulk optic comprising both that body and the wedge layer has the substantially constant net thickness.

In the preferred embodiment of FIG. 1, the thin film coatings each comprises a sputter-deposited mono-layer of metal, that is, a single layer of metal such as would be deposited by sputter deposition without any intervening or other deposited layers (excepting, for example, anti-reflection films, transparent protective overcoats or the like, as those skilled in the art would recognize), and preferably without any intervening change of target material, vacuum chamber atmosphere or the like during deposition of the mono-layer. Exemplary metal layers (understood to include impurities, trace elements, optionally doping agents or the like, and to have an actual deposited form which may not be entirely a true metallic form) include silver, aluminum, tantalum, zirconium and magnesium. Other suitable materials will be readily apparent to those skilled in the art given the benefit of this disclosure. Such metal mono-layers in certain embodiments are slightly absorptive and the resulting etalon can be advantageously adapted for use as an induced transmission filter, useful for example in optical elements for certain medical applications.

As noted above, the bulk optic component of the etalon of FIG. 1 comprises a thickness-adjustment layer 26 of substantially uniform thickness. Such layers may typically be between e.g. 0 and 100 microns thick, typically between about 1 and 10 microns thick, preferably less than about 5 microns thick, for example about 2 microns thick. Optical monitoring can be used to control deposition of the thickness-adjustment layer. The deposition is controlled such that total thickness achieves the desired half wave condition for the bulk optic component of the etalon, which corresponds to the wavelength at which the etalon is to be resonant.

Figure 3:
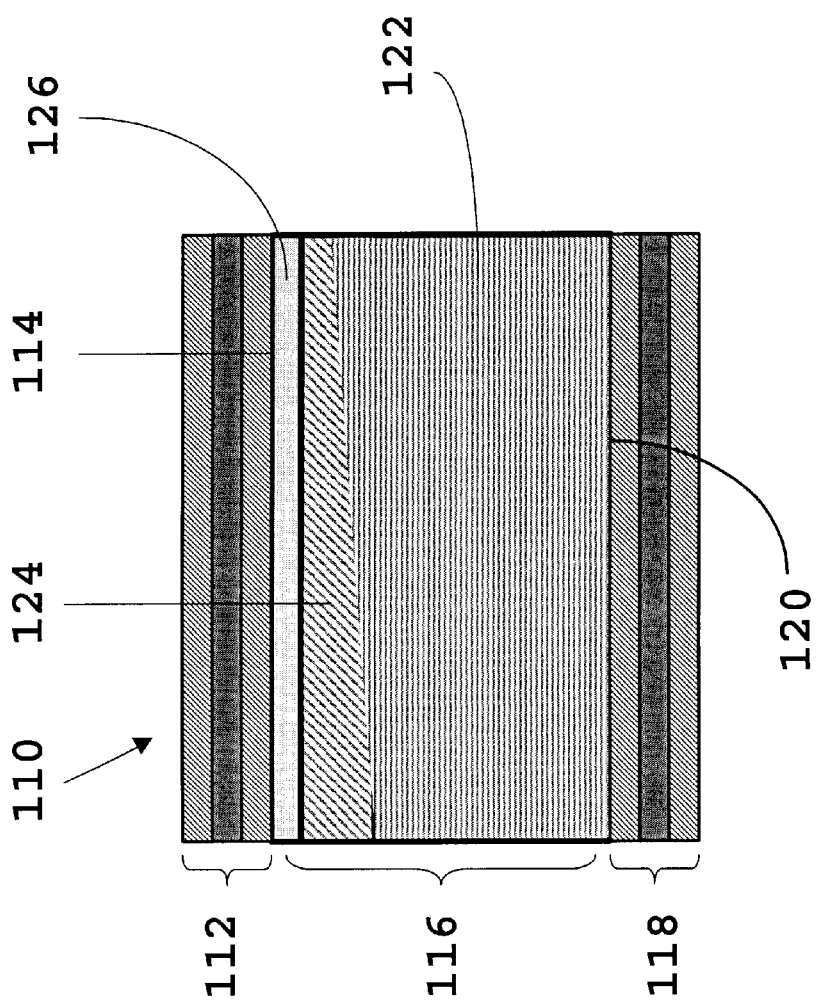
FIG. 3 is a schematic section view of an etalon suitable for use in the stacked, optically coupled etalons according to a second preferred embodiment.

Referring now to FIG. 3, an etalon 110 is seen to comprise a first thin film coating 112 on surface 114 of bulk optic 116 which forms the etalon's cavity. Second thin film 118 is deposited on parallel opposite surface 120 of the bulk optic. The bulk optic 116 comprises a solid, optically transparent body 122, wedge coating 124 overlying the optically transparent body, and thickness-adjustment layer 126 sandwiched between the wedge coating 124 and the thin film 112. The axial dimension of the bulk optic, i.e., the dimension of the bulk optic in the direction of light passage, defines the cavity spacing of the etalon. The optically transparent body 122 preferably is a monolithic body as described above in connection with the embodiment of FIG. 1. Materials suitable for the optically transparent body, wedge coating and thickness-adjustment layer include those discussed above. The Fabry-Perot thin film mirror coating 112 and 118 in the embodiment of FIG. 3 are dielectric film stacks of alternating high and low index of refraction. That is, the two thin film mirror coatings 112, 118 are formed of alternating sputtering-deposited layers of low refractive index material and high refractive index material, often referred to as H/L/H film stacks. For representative purposes, each is shown as having three films in its film stack; typically, as is well known to those skilled in the art, film stacks comprising many more alternating films may be used to achieve desired optical performance characteristics. Typically, coatings 112 and 118 will have substantially identical film stacks. Selecting a suitable number of alternating layers and suitable film materials will be within the ability of those skilled in the art given the benefit of this disclosure. Preferably the film stacks are deposited by reactive magnetron sputtering, ion beam sputtering or other suitable technique, a number of which will be readily apparent to those skilled in the art given the benefit of this disclosure. Exemplary dielectric materials for the high refractive index layers of the film stack include $Ta_2O_5$, $ZrO_2$, and $Al_2O_3$. Exemplary dielectric materials for the low refractive index layers of the film stack include $SiO_2$ and MgF. Additional suitable materials will be readily apparent to those skilled in the art given the benefit of this disclosure.

Figure 4:
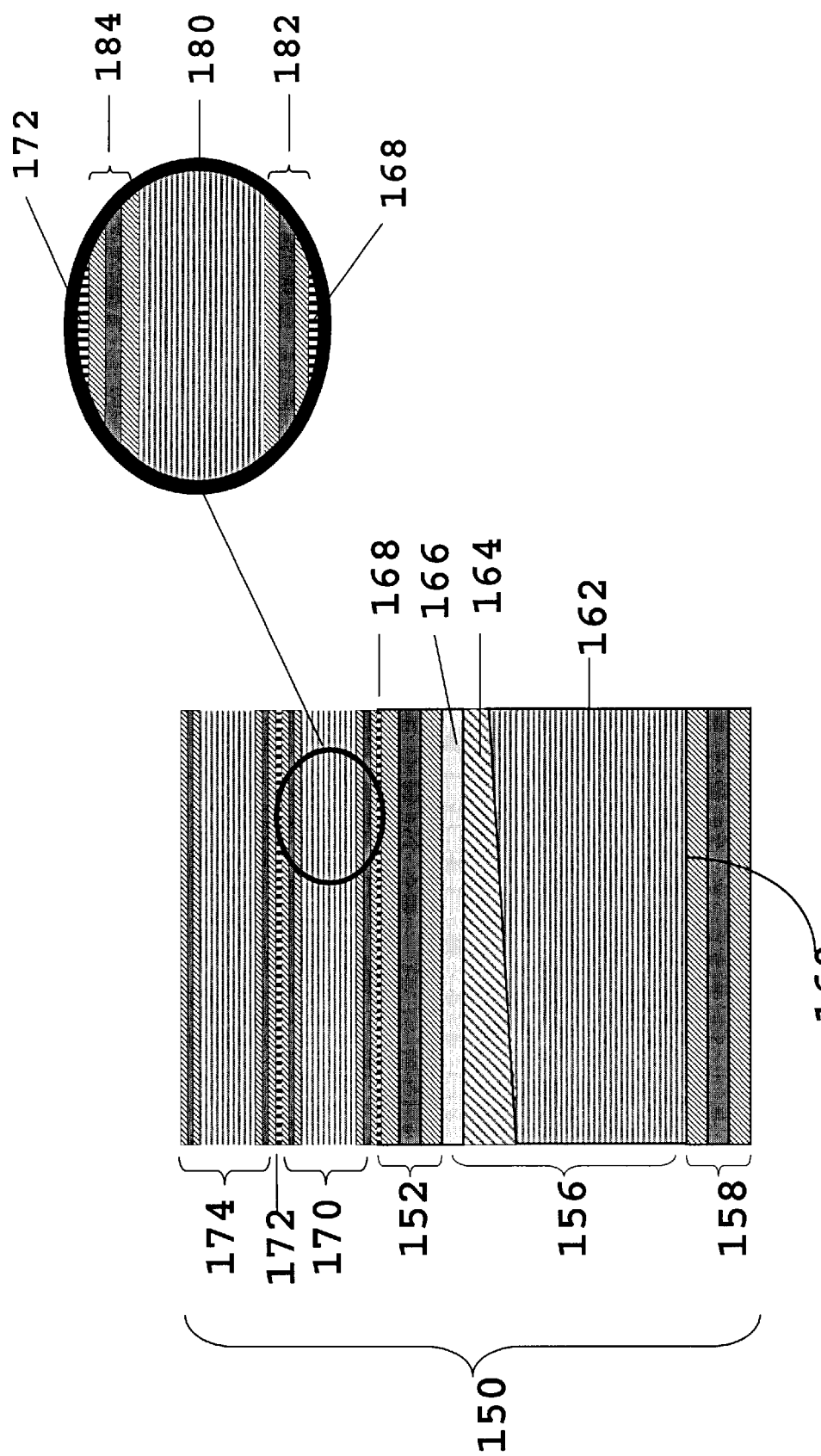
FIG. 4 is a schematic section view of an etalon comprising a thin film etalon deposited thereon.

In accordance with preferred embodiments, a multi-cavity etalon 150 comprising a bulk optic 156, thin film coatings 152 and 158, transition layers 168 and 172, and thin film etalons 170 and 174 is shown in FIG. 4. Typically the thin film etalons 170 and 174 are not optically matched with the bulk optic etalon but instead may be optically mismatched, e.g. the thin film etalon and the bulk optic etalon have a single common passband. Bulk optic 156 comprises an optically transparent body 162 and optionally a wedge coating 164 and thickness adjustment layer 166. On first side 160 of the bulk optic is thin film mirror coating 158. On the opposite side of the bulk optic is thin film mirror coating 152. After deposition of thin film mirror coatings 152 and 158, additional thin film coatings and cavity films may be deposited onto thin film coating 152 and/or onto thin film coating 158. Prior to deposition of the thin film coatings and cavity films of the thin film etalon, a first transition layer 168 is deposited using sputtering or other suitable techniques, e.g. ion beam sputtering, magnetron sputtering, etc. The first transition layer 168 is in direct surface-to-surface contact with thin film stack 152. Thin film coating 182, such as an H/L/H thin film stack for example, may be deposited onto transition layer 168. After deposition of thin film coating 182, a cavity film 180 may be deposited onto thin film coating 182. After deposition of the cavity film 180, second thin film coating 184 may be deposited onto cavity film 180. Therefore, a thin film etalon typically comprises a first thin film coating or stack, the cavity film, and a second thin film coating or stack. A second transition layer 172 may be deposited onto first thin film etalon 170, and the process just described may be repeated to provide deposition of additional thin film etalons, such as thin film etalon 174. In preferred embodiments, the thickness of the transition layer typically is an odd integer number (e.g. 1, 3, 5, 7 . . . ) of quarter wavelengths optical thickness (QWOTs). Typically the cavity film of the additional thin film etalons is deposited to a half-wave condition or an integral number of half waves. For example, in certain embodiments, the thickness of the cavity film can be from 1 to 10 half waves corresponding to about 0.5 to 5 microns for silica cavity film in an etalon operative in the C band. The thickness of the thin film coatings, of the thin film etalons, is preferably equal to an integral number of half waves.

In accordance with certain preferred embodiments, methods are provided of making an etalon, suitable for use in stacked, optically coupled etalons, as disclosed above. Such methods comprise the step of polishing at least one surface of an optically transparent substrate to produce an optically transparent body having opposite sides parallel preferably to within 5 arc seconds, more preferably to within 2.0 arc seconds. As discussed above, typical commercial processes do not reliably give adequate thickness and/or parallelism for good yield etalons intended for use in communication systems, etc. The methods further comprise depositing an optically transparent wedge coating on at least one of the opposite sides of the optically transparent body to produce a bulk optic having opposite sides parallel to within less than about 0.4 arc seconds, more preferably less than about 0.2 arc seconds, most preferably, for higher performance etalons, less than 0.1 arc second. Continual two-spot optical monitoring can be used to control deposition of the wedge coating as disclosed above. Reference here to "continually" monitoring thickness during deposition should be understood to meaning optionally, but not necessarily, monitoring continuously, and optionally monitoring regularly or repeatedly during the deposition.

The methods further comprise depositing a first selectively transparent thin film mirror coating on a first one of the opposite sides of the bulk optic and depositing a second such thin film coating on a second one of the opposite sides of the bulk optic to produce an etalon wherein the thickness of the bulk optic defines the cavity spacing of the etalon.

In accordance with certain preferred embodiments of the method described immediately above, approximately one-half of the total thickness of the desired wedge coating is deposited by sputter deposition, without rotation, onto a first side of an optically transparent substrate. The substrate and wedge coating may, for example, both be $SiO_2$. The first thin film coating is deposited over such wedge layer. The second one-half of the total thickness of the desired wedge coating then is deposited by sputter deposition, without rotation, onto the second side of the optically transparent substrate. Further, deposition then continues until sufficient quarter waves are coated onto this second half of the wedge to reach the desired total thickness, stopping deposition at a half wave condition. In accordance with certain preferred embodiments, the thickness-adjustment layer has a substantially uniform thickness between 0 and 100 microns more preferably between 1–5 microns. The second thin film coating is deposited over the wedge/thickness correction layer. In accordance with certain preferred embodiments, the first thin film coating and the second thin film coating are substantially identical and substantially optically transparent to at least one wavelength for which the etalon is resonant. Preferably, the transparent substrate is a wafer having a diameter greater than 3 inches and a thickness dependent on the intended optical properties. For production of optical bandpass filters, for example, for use in an optical communication systems in the C-band, a wafer having a thickness of about 0.5 mm is suitable with a finished thickness, after deposition of the wedge coating and thickness-adjustment layer, of about 0.5 mm for the etalon cavity. For etalons and stacked coupled etalons intended for the same application, but having a bandpass every 100 GHz, a substrate wafer having a thickness of about 1.0 mm is suitable. For etalons intended for the same application, but having a bandpass every 50 GHz, a substrate wafer having a thickness of about 2.0 mm is suitable. In general, it will be within the ability of those skilled in the art, given the benefit of this disclosure, to select substrate wafers of suitable thickness for forming the bulk optic cavity of the optical element disclosed here. Similarly, it will be within the ability of those skilled in the art given the benefit of this disclosure, to deposit wedge coatings and thickness-adjustment layers of suitable thickness on such substrate wafers to produce etalon cavities having an optical thickness proper for the intended application of the optical element. The method further comprises the step of dicing the wafer into multiple coupons and/or etalons following deposition of the first and second thin film coatings. Dicing the wafer typically is accomplished by sawing or grinding through the wafer in accordance with methods and equipment whose applicability to the present invention will be readily apparent to those skilled in the art given the benefit of the present invention. The parallel sides of such diced coupons, having the thin film coating thereon, preferably are 0.5 to 5.0 mm across the largest dimension.

In accordance with preferred embodiments, after deposition of the thin film stacks overlying the bulk optic, transition layers and thin film etalons can be deposited prior to removal of the etalon from the deposition apparatus, e.g. the thin film etalon may be deposited continuously after deposition of the wedge coating, thickness-adjustment layer, and thin film mirror coatings of the bulk optic etalon. That is, transition layers and thin film etalons may be deposited in a continuous manner after assembly of the bulk optic etalon. A first transition layer comprising materials similar to the bulk optic, wedge coating, and thickness-adjustment layer, such as silica for example, may be deposited onto the thin film stacks of the bulk optic etalon. After depositing a first transition layer, first thin film coating, such as an H/L/H thin film stack for example, may be deposited, in accordance with the methods and embodiments discussed above. A cavity film may subsequently be deposited onto the thin film coating overlying the first transition layer. The cavity film may comprise any suitable material known to those skilled in the art including but not limited to those materials disclosed above that comprise the bulk optic etalon. After deposition of the cavity film, second thin film coating, such as an H/L/H thin film stack for example, may be deposited onto the cavity film. Prior to deposition of additional thin film etalons, transition layers may be deposited to separate the multiple thin film etalons. One skilled in the art, given the benefit of this disclosure, will be able to deposit additional transition layers and thin film etalons suitable for use in optical systems and optical sensors, such as those used in the telecommunications industry.

Figure 5:
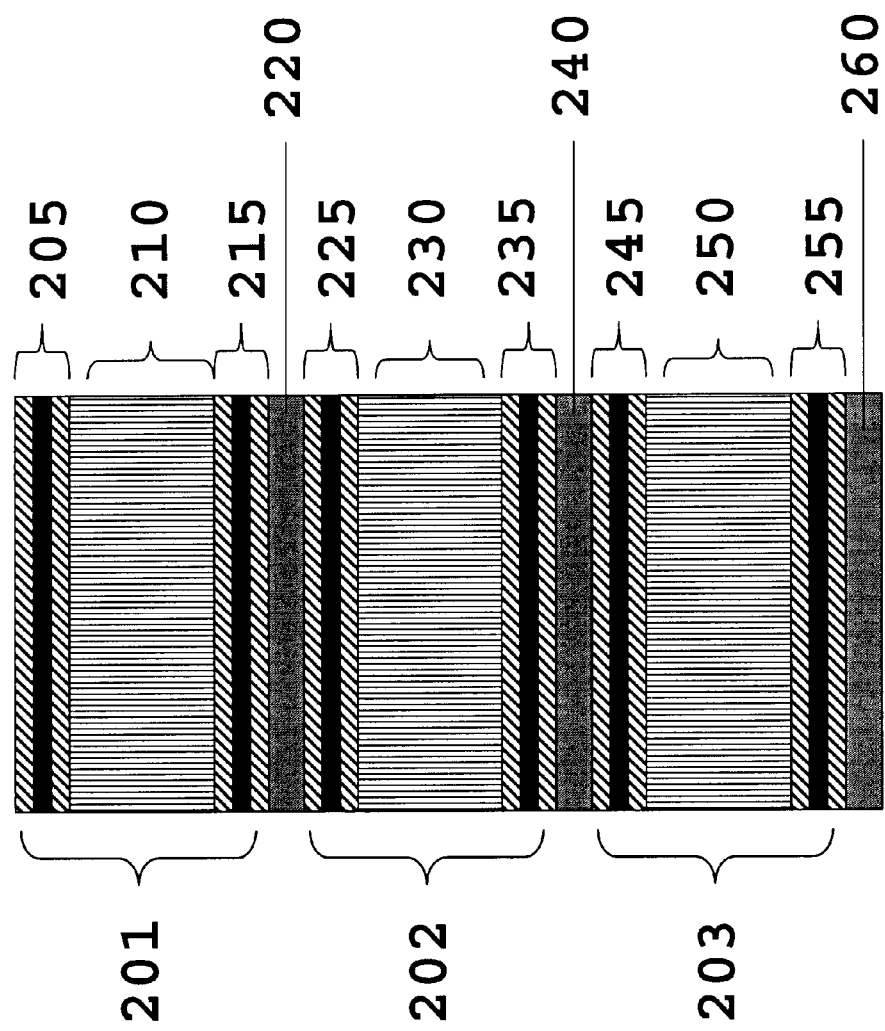
FIG. 5 is a schematic section view of a stack of optically coupled etalons in accordance with a preferred embodiment.

FIG. 5 illustrates schematically a preferred embodiment of the stacked, optically matched and optically coupled etalons disclosed here. One skilled in the art, given the benefit of this disclosure, will be able to assemble stacked, optically coupled etalons comprising the multi-cavity etalons described above. For convenience sake and for clarity, however, the etalons in the stacked, optically coupled etalons shown and described here comprise the components of the etalons shown in FIG. 1 and/or FIG. 3. Referring to FIG. 5, each etalon comprises the components of the etalon shown and described in FIG. 3 including a bulk optic 210 comprising thin film coatings 205 and 215. A first etalon 201, comprising the thin film coatings 205 and 215 and a bulk optic 210, is coupled to a second etalon 202, comprising thin film coatings 225 and 235 and a bulk optic 230, using an optically transparent bonding layer 220. The second etalon 202 is coupled to a third etalon 203, comprising thin film coatings 245 and 255 and bulk optic 250, using a transparent bonding layer 240. Each bulk optic may also comprise a thickness adjustment layer (not shown) and a wedge coating (not shown) underlying the thin film coatings. Additional etalons may be joined to the stack of optically coupled etalons described herein, e.g. by joining additional etalons via layer 260, which comprises a transparent bonding material. The number of coupled etalons is not limited to the number shown and described herein. One skilled in the art, given the benefit of this disclosure, would recognize that a plurality of etalons may be coupled together by addition of more bonding layers and more etalons.

In accordance with preferred embodiments, the bonding material in layers 220, 240, and 260 shown in FIG. 5 may each comprise any optically transparent material that is capable of bonding two or more etalons together. In preferred embodiments, the bonding material is deposited to a thickness equal to an odd number of QWOTs after the etalons are joined together. In certain embodiments, fritted glass is used to join the etalons together. The fritted glass is preferably deposited using a vapor deposition process or a sputter deposition process. The fritted glass may be deposited on both surfaces of a wafer, a coupon or an etalon. Alternatively, the flitted glass may only be deposited on one surface of a wafer, a coupon, or an etalon. The fritted glass is deposited so that the thickness of the fritted glass is equal to an odd number of QWOTs when the etalons are joined together. After deposition of the fritted glass on the wafers, coupons or etalons, the fritted glass can be heated to melt or soften the fritted glass. Placement of the wafers, coupons, or etalons in contact and re-solidification of the fritted glass results in joining of the wafers, coupons, or etalons. One skilled in the art would recognize that materials with similar properties and characteristics as fritted glass may be used to join the etalons together. In certain embodiments, a portion of the fritted glass is etched away to leave "feet" or projections on the surfaces of the wafers, the coupons, or the etalons. The "feet" may be treated similar to the fritted glass to join the wafers, coupons, or etalons together. In certain preferred embodiments, the bonding material comprises an epoxy or other adhesive or small beads in an adhesive. In preferred embodiments, the small bead/adhesive mixture is deposited to form a monolayer of beads after the wafers, coupons, or etalons are joined together. The uniform size of the beads provides for uniform spacing between adjacent coupled wafers, coupons, or etalons. In other preferred embodiments, the bonding material comprises EPO-TEK 353ND or other similar materials.

In additional preferred embodiments, the bonding layer is omitted and the etalons are placed into optical contact. Without wishing to be bound by theory, it is currently understood that when placed into optical contact, electrostatic forces hold the etalons together. Optionally, a coupling member may be used to maintain the optical contact. This coupling member may be any device capable of maintaining the etalons in position in the stack, e.g. a rigid jacket, a sleeve, etc.

Figure 6:
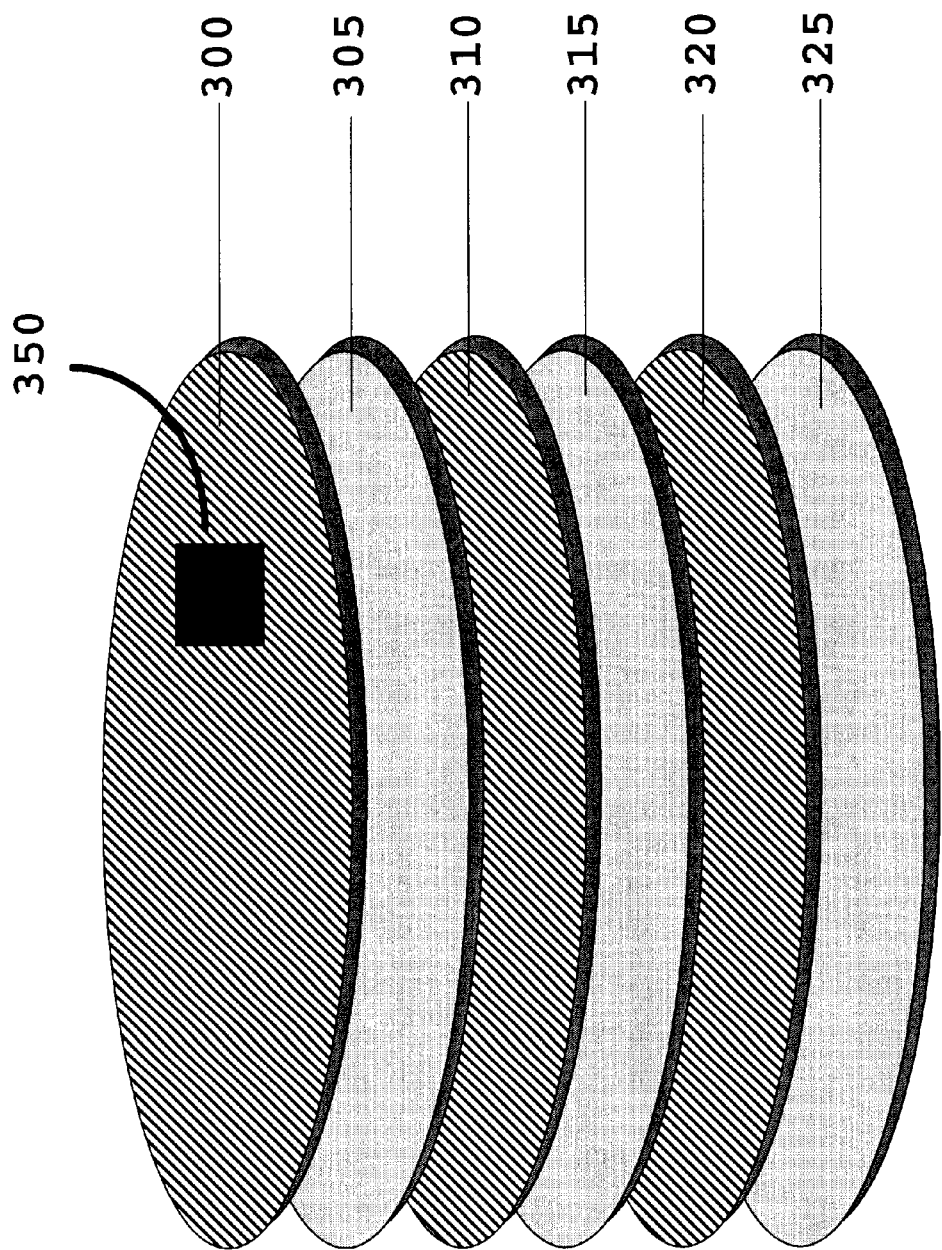
FIG. 6 is an exploded view of a stack of wafers.

In accordance with preferred embodiments, an exploded view of a method for production of stacked, optically coupled etalons is shown in FIG. 6. In this embodiment, wafers are joined together using a bonding material. A first wafer 300 and a second wafer 310 each comprises a bulk optic and thin film coatings. The bulk optic of the wafers may optionally comprise a thickness adjustment layer (not shown) and a wedge coating (not shown) underlying the thin films. A bonding material may be deposited onto one or more of the surfaces of the first wafer 300 or the second wafer 310. Preferably this bonding material is deposited using vapor deposition, sputter deposition, or other deposition processes known in the art. One skilled in the art would recognize that deposition of the bonding material on both surfaces is possible, but unnecessary, since only a single bonding layer is required between wafers to join the wafers together. After joining of the first and second wafers, a bonding layer 305 is created. Preferably the thickness of bonding layer 305 is equal to an odd number of QWOTs. A bonding material is also deposited on the surfaces of a third wafer 320. Third wafer 320 may also comprise thin film coatings and a bulk optic that optionally comprises a wedge coating and a thickness-adjustment layer. After joining the third wafer 320 to the second wafer 310, a bonding layer 315 is created. Preferably, the thickness of bonding layer 315 is equal to an odd number of QWOTs. One skilled in the art, given the benefit of this disclosure, would recognize that additional wafers may be joined to the third wafer using the method just described. Preferably, the thickness of any additional bonding layers are each equal to an odd numbers of QWOTs. In preferred embodiments, the wafer has a diameter of about 0.5 to 8 inches and thickness between the first and second surfaces of about 0.2 to 2 mm.

Figure 7:
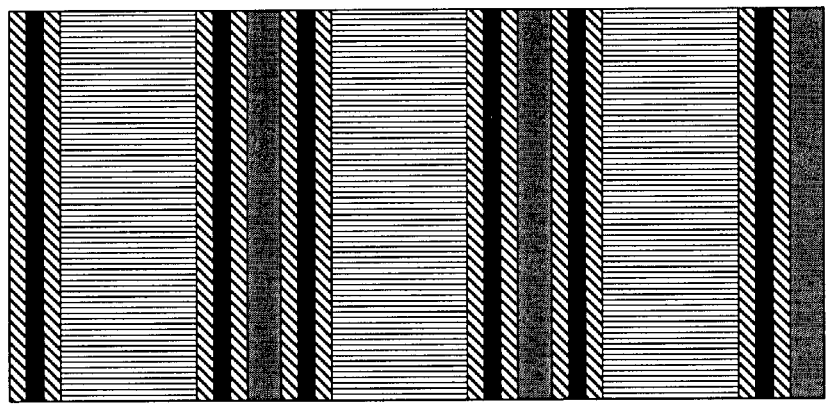
FIG. 7 is a section view of a stacked etalon diced from the stacked wafers shown in FIG. 5.

The method immediately described provides a robust and rapid method for rapidly assembling stacked wafers. In accordance with preferred embodiments, the wafers may but cut or diced into smaller fragments known as "coupons." The coupons may further be diced into one or more stacked, optically coupled etalons as shown in FIG. 7. The diced stacked, optically coupled etalons may be tested for specific properties. Stacked, optically coupled etalons having similar properties, i.e. optically transparent to the same wavelength, may be incorporated into optical elements, optical communications devices or optical sensors.

Figure 8C:
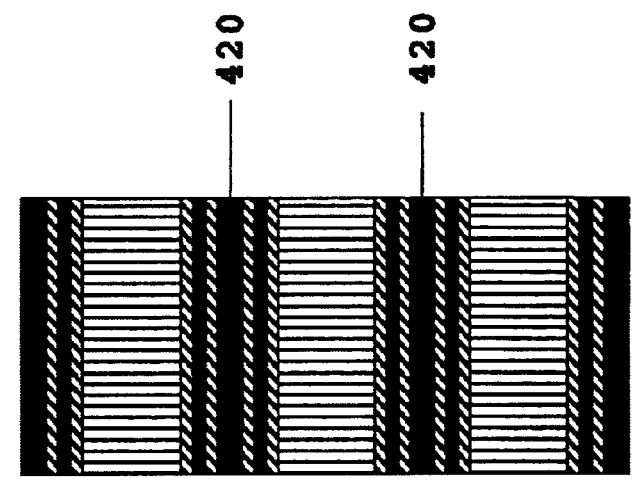
FIGS. 8a–8c is a sequential representation of a first embodiment of a method for joining etalons using a bonding material.
Figure 8B:
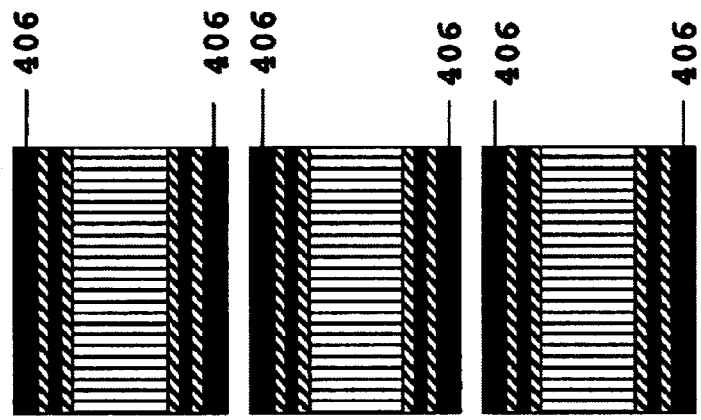
Figure 8A:
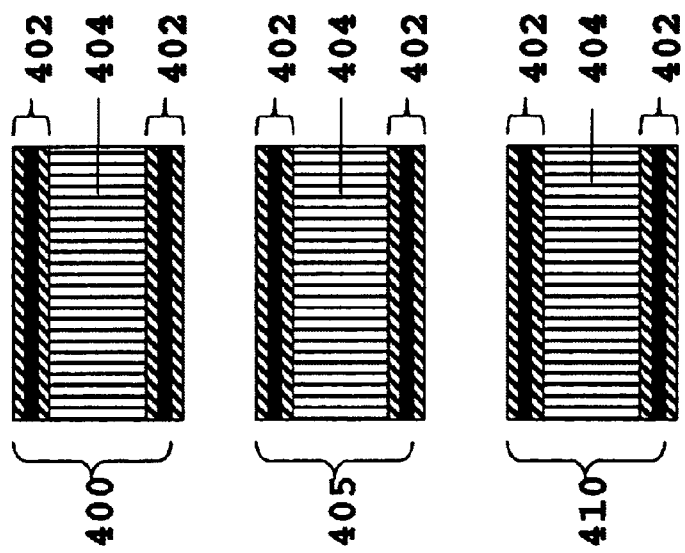

In accordance with preferred embodiments, a method for production of stacked, optically coupled etalons is shown in FIGS. 8a–8c. In this embodiment, individual etalons are stacked and coupled using bonding layers. A first etalon 400, a second etalon 405, and a third etalon 410 each comprise the components of the etalon shown and described in FIG. 3 including thin film coatings 402 on both surfaces of a bulk optic 404 (see FIG. 8a). The bulk optic may also comprise a thickness adjustment layer (not shown) and a wedge coating (not shown) underlying the thin films. A bonding material 406 is deposited on the surfaces of the first, second, and third etalons (see FIG. 8b). Preferably this bonding material is deposited using vapor deposition, sputter deposition, or other deposition processes known in the art. After joining the first, second, and third etalons, bonding layers 420 are created (see FIG. 8c). Preferably the thickness of each bonding layer is equal to an odd number of QWOTs. One skilled in the art would recognize, given the benefit of this disclosure, that additional etalons may be coupled to the third etalon using the method just described. The thickness of the bonding layers that would be created by adding additional etalons are preferably each equal to an odd number of QWOTs.

Figure 9C:
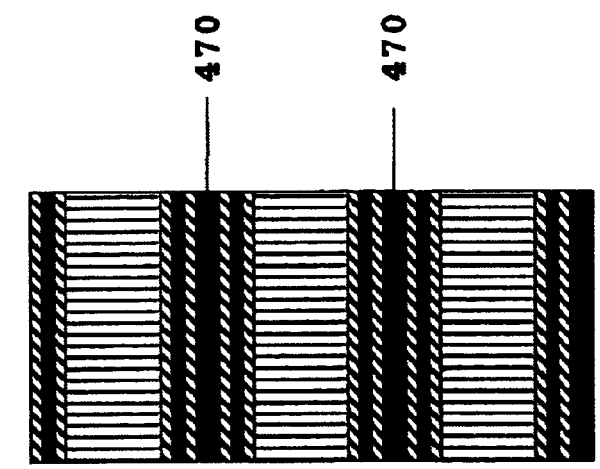
FIGS. 9a–9c is a sequential representation of a second embodiment of a method for joining etalons using a bonding material.
Figure 9B:
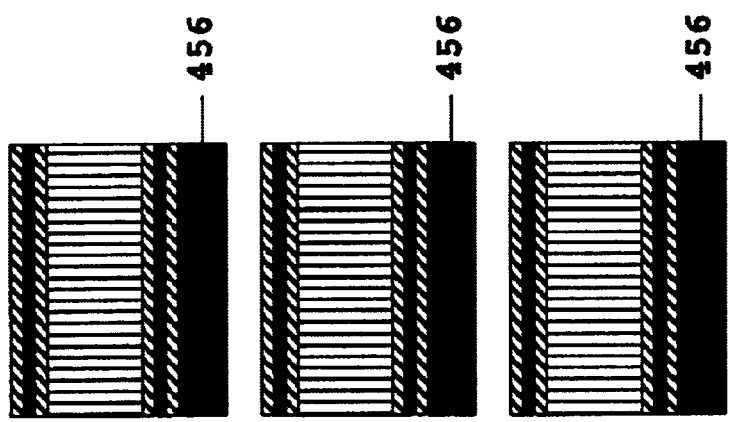
Figure 9A:
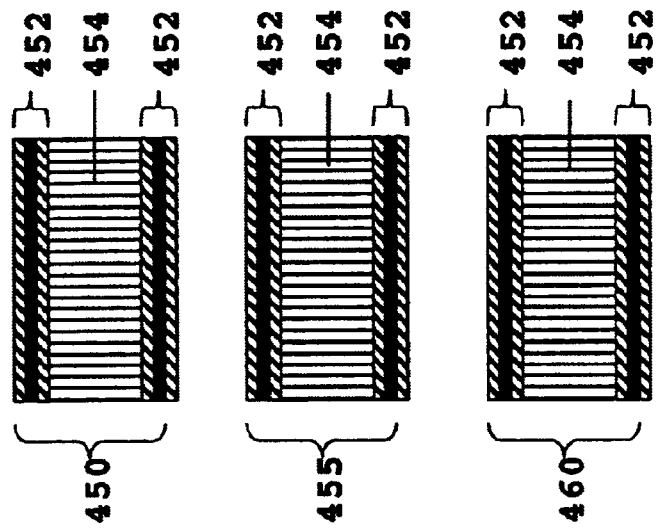

In accordance with preferred embodiments, a method for production of stacked, optically coupled etalons is shown in FIGS. 9a–9c. In this embodiment, individual etalons are stacked and coupled using bonding layers. A first etalon 450, a second etalon 455, and a third etalon 460 each comprise the components of the etalon shown and described in FIG. 3 including thin film coatings 452 on both surfaces of a bulk optic 454 (see FIG. 9a). The bulk optic may also comprise a thickness adjustment layer (not shown) and a wedge coating (not shown) underlying the thin films. A bonding material 456 is deposited on one surface of the first, second and third etalons (see FIG. 9b). Preferably this bonding material is deposited using vapor deposition, sputter deposition, or other deposition processes known in the art. The bonding layer is deposited on one surface of the two etalons that are to be coupled. After joining the first, second, and third etalons, bonding layers 470 are created (see FIG. 9c). Preferably the thickness of each bonding layer is equal to an odd number of QWOTs. One skilled in the art would recognize, given the benefit of this disclosure, that additional etalons may be coupled to the third etalon using the method just described. An advantage of this method is that the bonding material need only be deposited on one surface of the etalons. Therefore, the process of assembling stacked, optically coupled etalons is more efficient. In accordance with other preferred embodiments, the bonding layer may comprise any optically transparent material that is capable of bonding two or more etalons together, such as those materials previously discussed above.

In accordance with other preferred embodiments, the bonding layer comprises fritted glass. The fritted glass is preferably deposited using a vapor deposition process or a sputter deposition process. The fritted glass may be deposited on both surfaces of the etalon. Alternatively, the flitted glass may only be deposited on one surface of the etalon. The fritted glass is deposited so that the thickness of the fritted glass is equal to an odd number of QWOTs when the etalons are joined together. After deposition of the fritted glass on the etalons, the etalons may be joined by heating of the fritted glass. Melting and re-solidification of the fritted glass results in joining of the etalons.

Figure 10D:
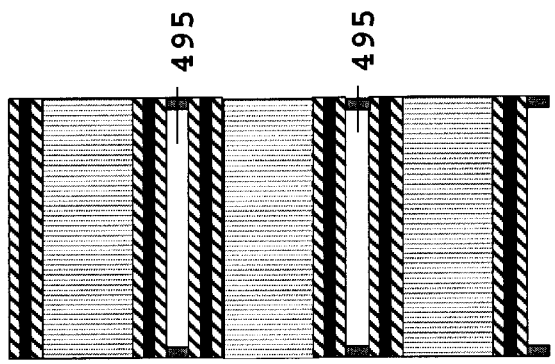
FIGS. 10a–10d is a sequential representation of a third embodiment of a method for joining etalons using feet.
Figure 10C:
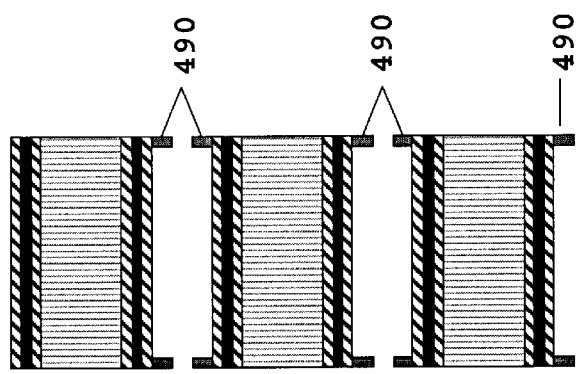
Figure 10B:
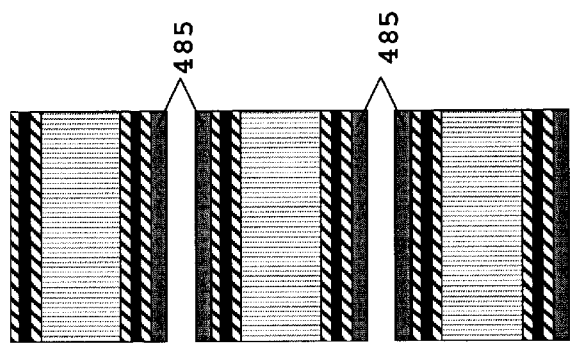
Figure 10A:
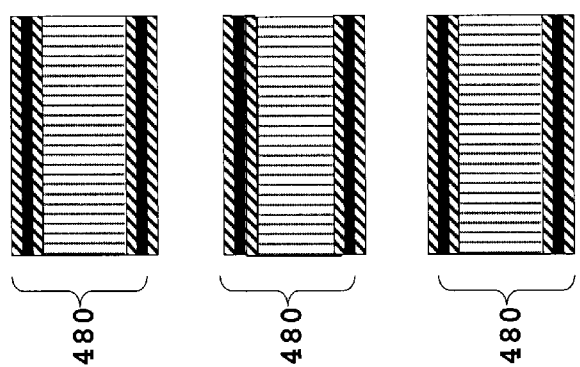

In accordance with additional preferred embodiments, fritted glass feet may be used to assemble the stacked, optically coupled etalons. As shown in FIG. 10a, each etalon 480 may comprise thin film coatings and a bulk optic, as discussed above. In certain embodiments, a bonding material 485, comprising fritted glass, is deposited on at least one surface of the etalons 485 (see FIG. 10b). A portion of bonding material 485 may be etched away to form fritted glass feet 490 (see FIG. 10c). In other embodiments, the fritted glass feet 490 are deposited directly onto the surfaces of the etalons 480.

Preferably the fritted glass is deposited using vapor deposition, sputter deposition, or other deposition processes known in the art. The feet of the etalons may be placed in contact with each other prior to heating or softening. The etalons are joined after the feet melt or soften and re-solidify (see FIG. 10d). After joining the etalons, the space 495 between the surfaces of the etalons is preferably equal to an odd number of QWOTs. The space 495 between adjacent coupled etalons may be filled with air or other suitable materials, depending on the intended use of the stacked, optically coupled etalons.

Figures 11A, 11B:
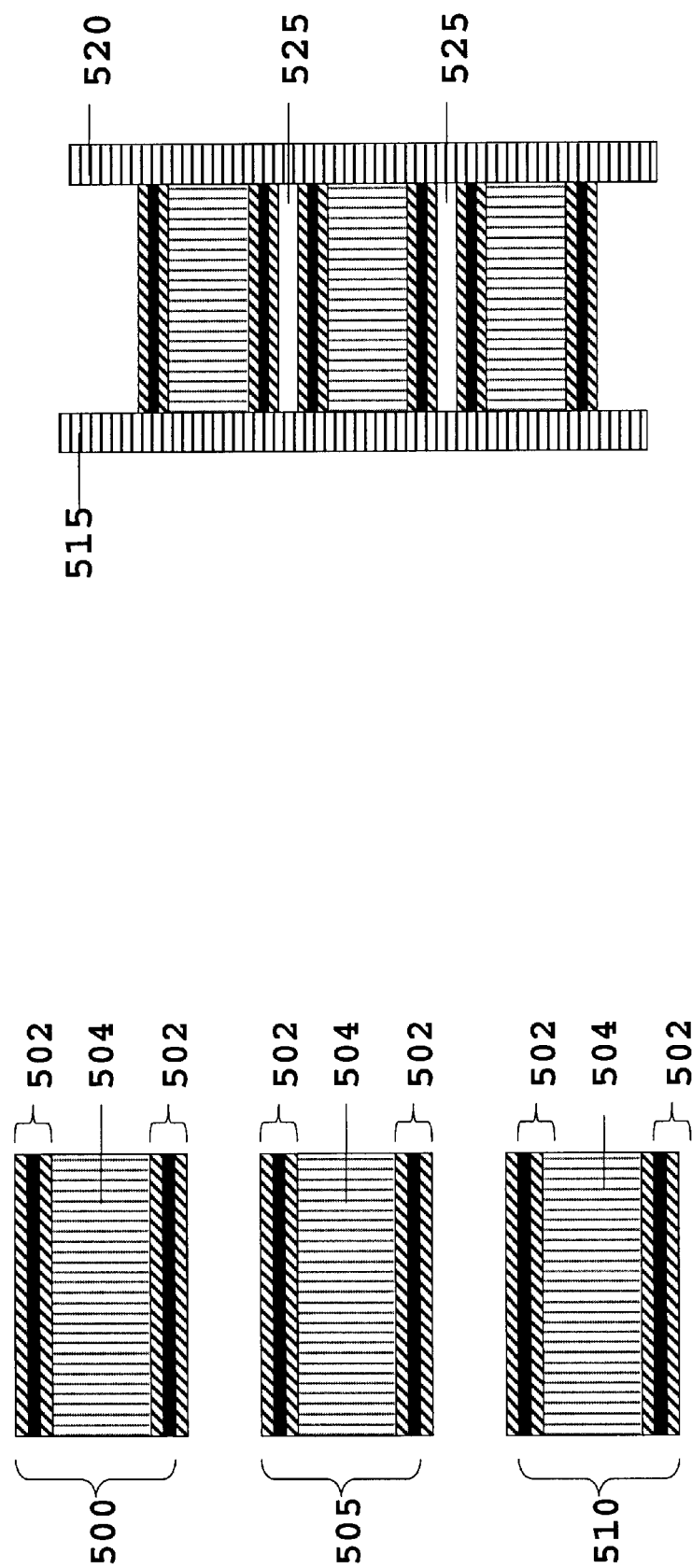
FIGS. 11a–11b is a sequential representation of a first embodiment of a method for optically coupling etalons using a coupling member.

In accordance with additional preferred embodiments, a method for production of stacked, optically coupled etalons is shown in FIGS. 11a–11b. In this embodiment, the stacked, optically coupled etalons are in optical contact. A first etalon 500, a second etalon 505, and a third etalon 510 each comprise the components of the etalon shown and described in FIG. 3 including thin film coatings 502 on both surfaces of a bulk optic 504 (see FIG. 11a). The bulk optic may also comprise a thickness adjustment layer (not shown) and a wedge coating (not shown) underlying the thin film coatings. A first coupling member 515 and a second coupling member 520 maintain optical contact between the first, second, and third etalons (see FIG. 11*b*). The space 525 between adjacent etalons may be filled with air or other substances depending on the intended application of the stacked, optically coupled etalons. The thickness of the space between adjacent etalons is preferably equal to an odd number of QWOTs. One skilled in the art would recognize, given the benefit of this disclosure, that additional etalons may be coupled to the third etalon using the coupling members 515 and 520 and the method just described.

Figure 12B:
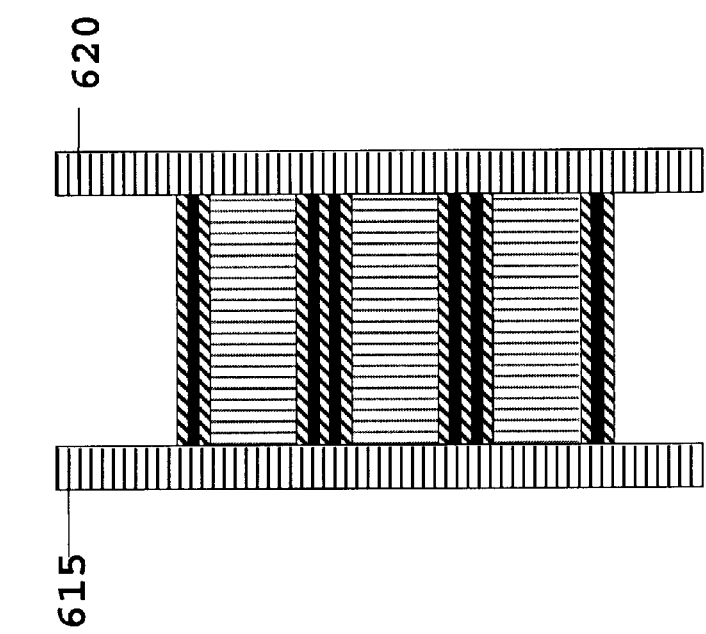
FIGS. 12a–12b is a sequential representation of a second embodiment of a method for optically coupling etalons using a coupling member.
Figure 12A:
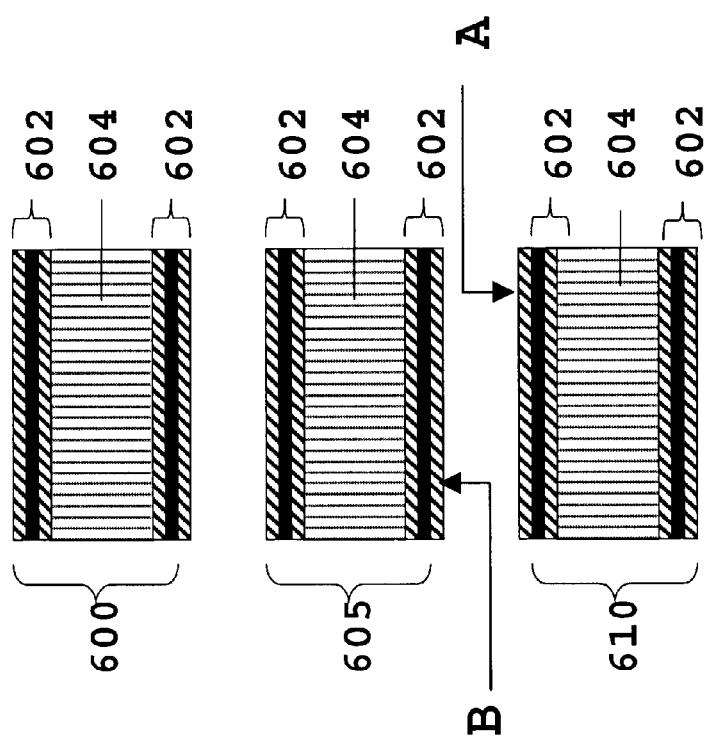

In accordance with additional preferred embodiments, a method for production of stacked, optically coupled etalons is shown in FIGS. 12*a*–12*b*. In this embodiment, the stacked, optically coupled etalons are in optical contact. A first etalon 600, a second etalon 605, and a third etalon 610 each comprise the components of the etalon shown and described in FIG. 3 including thin film coatings 602 on both surfaces of a bulk optic 604 (see FIG. 12*a*). The bulk optic may also comprise a thickness adjustment layer (not shown) and a wedge coating (not shown) underlying the thin films. A first coupling member 615 and a second coupling member 620 maintain optical contact between the first, second and third etalons (see FIG. 12*b*). In this embodiment, there is no space between adjacent etalon surfaces after the etalons are joined. The thickness of the thin films may be altered to provide for the correct film thickness after the etalons are joined together. For example, if the thin film comprises a high refractive index oxide layer, a low refractive index oxide layer, followed by a high refractive index oxide layer (H/L/H), then to insure the thin film layers have the correct thickness after the etalons are joined, the thickness of the outermost (furthest from the surface of the bulk optic) high refractive index oxide layer may be reduced. That is, for example, the thickness of the outermost high refractive index oxide layer 602 of etalons 610 (see arrow A in FIG. 12*a*) and 605 (see arrow B in FIG. 12*a*), that will be in surface-to-surface contact may be reduced, e.g. by half, so that after joining adjacent etalons a thickness equal to an integral number of half waves is obtained, e.g. after joining adjacent etalons the thickness of each oxide layer preferably is equal to an integral number of half waves and the thickness of each oxide layer is approximately the same. One skilled in the art would recognize, given the benefit of this disclosure, that additional etalons may be coupled to the third etalon using the coupling members 615 and 620 and the method just described.

Figure 13B:
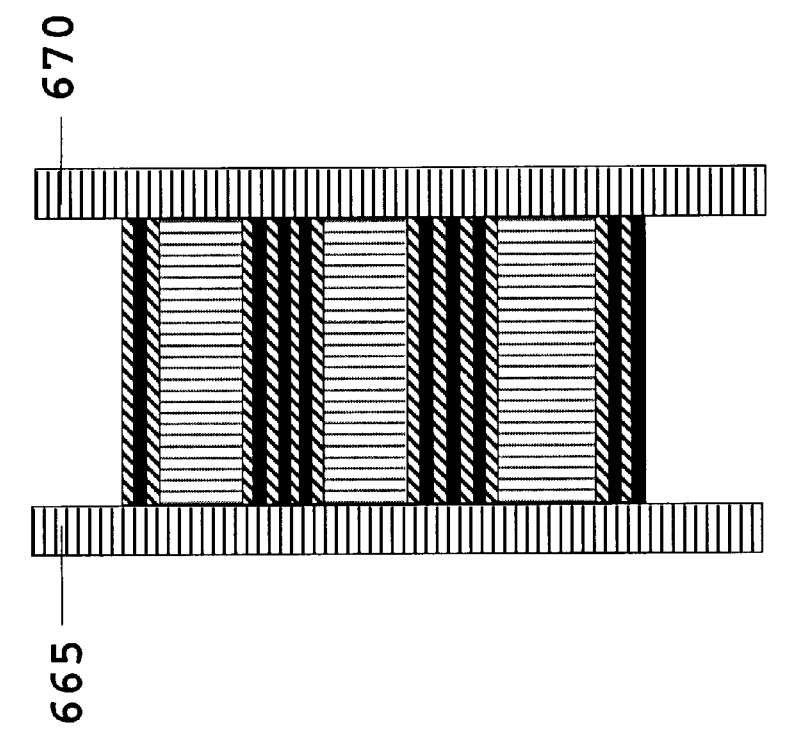
FIGS. 13a–13b is a sequential representation of a third embodiment of a method for optically coupling etalons using a coupling member.
Figure 13A:
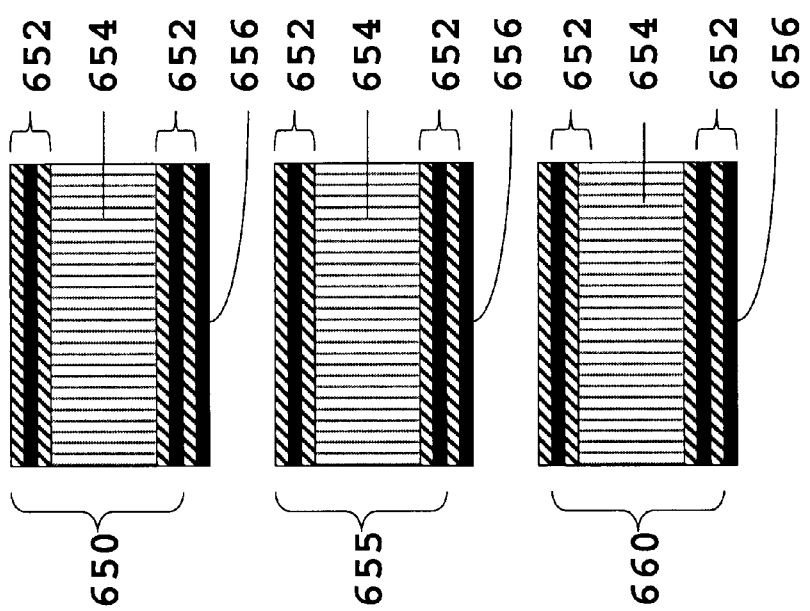

In accordance with additional preferred embodiments, a method for production of stacked, optically coupled etalons is shown in FIGS. 13*a*–13*b*. In this embodiment, the stacked, optically coupled etalons are in optical contact. A first etalon 650, a second etalon 655, and a third etalon 660 each comprise the components of the etalon shown and described in FIG. 3 including thin film coatings 652 on both surfaces of a bulk optic 654 (see FIG. 13*a*). The bulk optic may also comprise a thickness adjustment layer (not shown) and a wedge coating (not shown) underlying the thin films. A first coupling member 665 and a second coupling member 670 maintain optical contact between the first, second, and third etalons (see FIG. 13*b*). In this embodiment, there is no space between adjacent etalon surfaces. The order of layers of the thin films may be altered to provide for alternating high and low refractive oxide layers after the etalons are coupled. For example, if the thin film comprises a high refractive index oxide layer, a low refractive index oxide layer, followed by a high refractive index oxide layer (H/L/H), then to insure that alternating layers exist in the stacked, optically coupled etalons, an additional low refractive index oxide layer 656 may be deposited onto one or more of the etalons (see FIG. 13*a*). In this example, after joining the etalons the order of the oxide layers between the two bulk optics would be H/L/H/L/H/L/H, where each oxide layer has approximately the same thickness, e.g. an integral number of half waves. One skilled in the art would recognize, given the benefit of this disclosure, that additional etalons may be coupled to the third etalon using the coupling members 665 and 670 and the method just described.

Figure 14B:
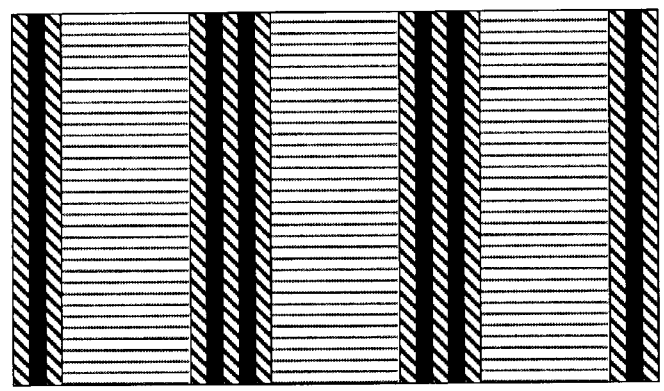
FIGS. 14a–14b is a sequential representation of a first embodiment of a method for optically coupling etalons without using a coupling member.
Figure 14A:
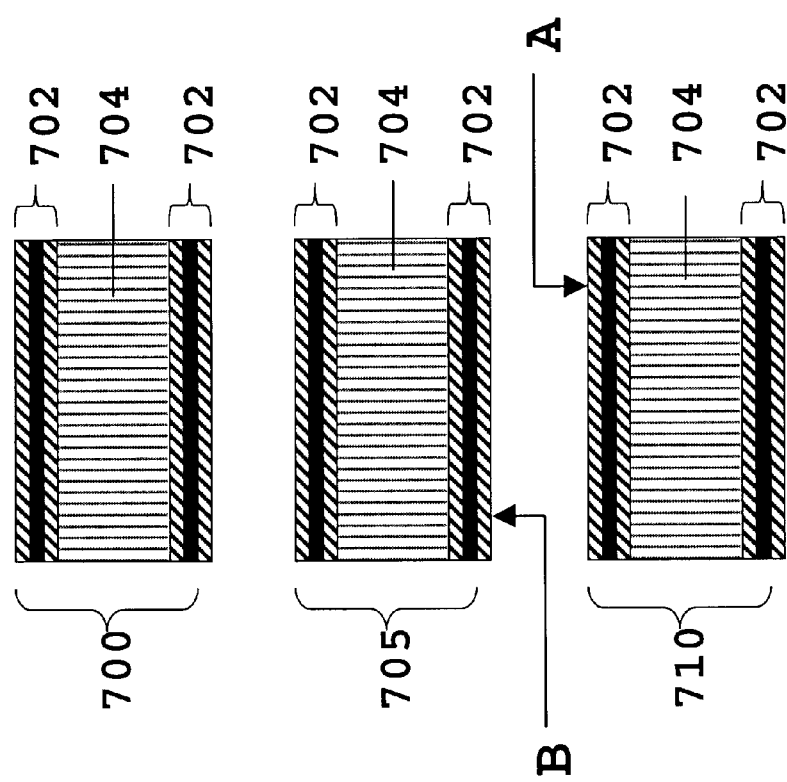

In accordance with additional preferred embodiments, a method for production of stacked, optically coupled etalons is shown in FIGS. 14*a*–14*b*. In this embodiment, the stacked, optically coupled etalons are in optical contact. A first etalon 700, a second etalon 705, and a third etalon 710 each comprise the components of the etalon shown and described in FIG. 3 including thin film coatings 702 on both surfaces of a bulk optic 704 (see FIG. 14*a*). The bulk optic may also comprise a thickness adjustment layer (not shown) and a wedge coating (not shown) underlying the thin films. In this embodiment, after joining of the etalons, there is no space between the etalon surfaces and a coupling member is not used (see FIG. 14*b*). Without wishing to be bound by theory, the etalons are held together by electrostatic forces between the surfaces of the thin film coatings. The thickness of the thin films may be altered to provide for the correct thickness after the etalons are coupled. For example, if the thin film comprises a high refractive index oxide layer, a low refractive index oxide layer, followed by a high refractive index oxide layer (H/L/H), then to insure the layers have the correct thickness after the etalons are joined, the thickness of the outermost (furthest from the surface of the bulk optic) high refractive index oxide layer may be reduced. That is, for example, the thickness of the outermost high refractive index oxide layer 702 of etalons 710 (see arrow A in FIG. 14*a*) and 705 (see arrow B in FIG. 14*a*), that will be in surface-to-surface contact may be reduced, e.g. by half, so that after joining adjacent etalons a thickness equal to an integral number of half waves is obtained, e.g. after joining adjacent etalons the thickness of each oxide layer preferably is equal to an integral number of half waves and the thickness of each oxide layer is approximately the same. In this example, after joining the etalons the order of the oxide layers between bulk optic bodies would then be H/L/H/L/H, where each oxide layer has approximately the same thickness, e.g. an integral number of half waves. One skilled in the art would recognize, given the benefit of this disclosure, that additional etalons may be coupled to the third etalon using the method just described.

Figure 15B:
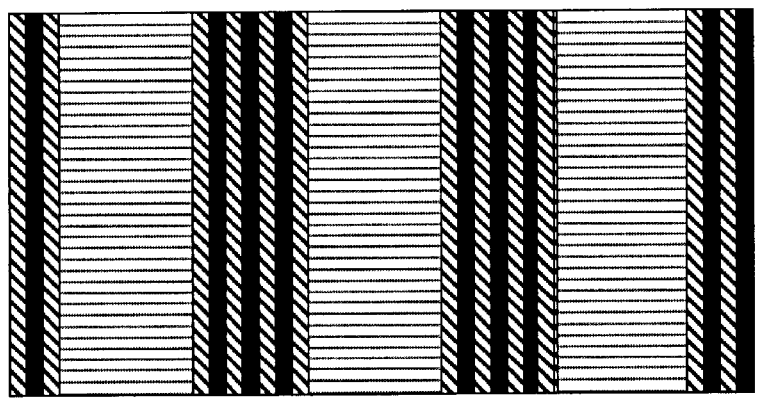
FIGS. 15a–15b is a sequential representation of a second embodiment of a method for optically coupling etalons without using a coupling member.
Figure 15A:
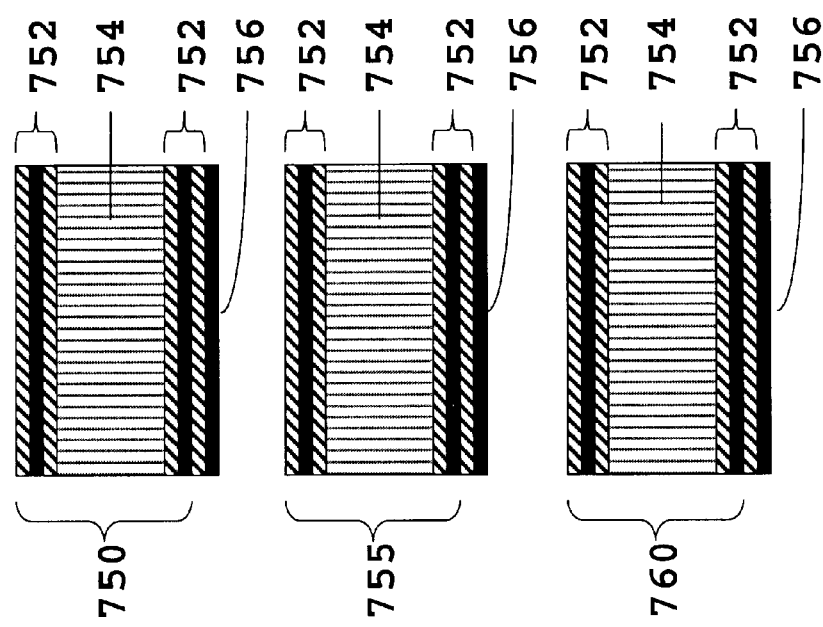

In accordance with additional preferred embodiments, a method for production of stacked, optically coupled etalons is shown in FIGS. 15*a*–15*b*. In this embodiment, the stacked, optically coupled etalons are in optical contact. A first etalon 750, a second etalon 755, and a third etalon 760 each comprise the components of the etalon shown and described in FIG. 3 including thin film coatings 752 on both surfaces of a bulk optic 754 (see FIG. 15*a*). The bulk optic may also comprise a thickness adjustment layer (not shown) and a wedge coating (not shown) underlying the thin film. In this embodiment, after joining the etalons, there is no space between the etalon surfaces and a coupling member is not used (see FIG. 15*b*). Without wishing to be bound by theory, the etalons are held together by electrostatic forces between the surfaces of the thin film coatings. The order of the oxide layers of the thin film may be altered to provide for an alternating high and low refractive oxide layers after the etalons are coupled. For example, if the thin film comprises a high refractive index oxide layer, a low refractive index oxide layer, followed by a high refractive index oxide layer (H/L/H), then to insure that alternating layers exist in the coupled etalons, an additional low refractive index oxide layer 756 may be deposited onto one of the etalons (see FIG. 15a). In this example, after joining the etalons the order of the oxide layers between the bulk optic would then be H/L/H/L/H/L/H, where each layer has approximately the same thickness. One skilled in the art would recognize, given the benefit of this disclosure, that additional etalons may be coupled to the third etalon using the method just described.

In accordance with certain preferred embodiments, optical elements are provided comprising stacked, optically coupled etalons as disclosed above. Such optical elements may further comprise a bandpass filter optically coupled to the stacked, optically coupled etalon. Also, such optical elements may comprise a temperature compensator joined to the stacked, optically coupled etalons. Suitable temperature compensators are known to those skilled in the art, including for example the temperature compensators disclosed in U.S. Pat. No. 5,982,488 to Shirasaki and in U.S. patent application Ser. No. 60/275,920 Banner & Witcoff, LTD titled "Iso-Optical Thermal Compensator and Methods of Making and Using Same," the entire disclosures of which are incorporated herein by reference.

In accordance with preferred embodiments, optical communication systems are provided comprising stacked, optically coupled etalons as disclosed above. It will be within the ability of those skilled in the art, given the benefit of this disclosure, to produce the stacked, optically coupled etalons disclosed here, suitable for use in optical communication systems.

In accordance with preferred embodiments, optical sensors are provided comprising stacked, optically coupled etalons as disclosed above. It will be within the ability of those skilled in the art, given the benefit of this disclosure, to produce the stacked, optically coupled etalons disclosed here, suitable for use in optical sensors.

For illustrative purposes only and without limitation, an example of this novel technology is disclosed below.

Example 1 (Stacked, Optically Coupled Etalons, Wherein Each Etalon Comprises a Bulk Optic+ Wedge Coating, Then Thickness Adjustment, Then FP Thin Films)

Stacked, optically coupled etalons are prepared. Each etalon in the stacked, optically coupled etalons, in accordance with the disclosure above, is prepared as follows. A 2 inch diameter wafer of silica approximately 0.5 mm thick is sliced from a log of that diameter. The wafer is planarized using commercial polishing techniques. The resulting wafer has a thickness of approximately 0.5 mm at its thickest point with a wedge angle of 2 arc sec. Additional thickness measurements establish that thickness changes progressively; that is, thickness of the wafer varies substantially linearly from the thinnest to the thickest point. The wedge angle is corrected by coating. Specifically, the wafer is mounted in a vacuum chamber equipped for ion beam sputtering from a silica target. The wafer is mounted stationary, i.e., without spinning, and offset from the source at an angle of approximately 45 degrees, with the thinnest point of the wedge closest to the source (for example, approximately 8 inches). During sputtering, the thickness of the wafer is continually optically monitored. Deposition is continued for up to three hours, after which optical monitoring indicates substantial uniformity of wafer thickness. The wafer is then removed from the vacuum chamber. The physical thickness of the wafer is measured and found to have less than about 10 nm of runout.

Following such wedge correction, the precise thickness of the bulk optic is adjusted by further coating with silica. Specifically, the wafer is mounted in a vacuum chamber equipped for sputtering from a silica target. The wafer is mounted for spinning during deposition, and thickness of the wafer is continually optically monitored. Deposition is halted when optical monitoring indicates that the total thickness of the bulk optic, including the original planarized wafer, wedge coating and thickness-correction layer is within about 10 nm of desired thickness. An H/L/H type mirror stack (partial reflection) is then deposited on each surface of the wafer by sputtering the thin film stack comprising 3 alternating layers of silica and $Ta_2O_5$ for example. The etalon can be further tuned for wavelength, if necessary, using angle, heat treatment, strain, temperature control or other means.

Optically matched etalons, those having the same center wavelength, for example, from above are joined to form stacked, optically coupled etalons, in accordance with the disclosure above. Individual etalons from above are placed into optical contact without using a coupling member. The stacked, optically coupled etalons are tested without temperature compensation at an operating temperature of 0 to 70° C. Performance results are shown in Table I below.

TABLE I

| Bandwidth (0.5 dB) | >0.25 nm |
|---|---|
| Insertion loss | <0.1 dB |
| Isolation (20 dB) | <0.75 nm |
| Polarization dependent loss (PDL) | <0.1 dB |
| Temperature coefficient | 0.012 nm/° C. |

Figure 16:
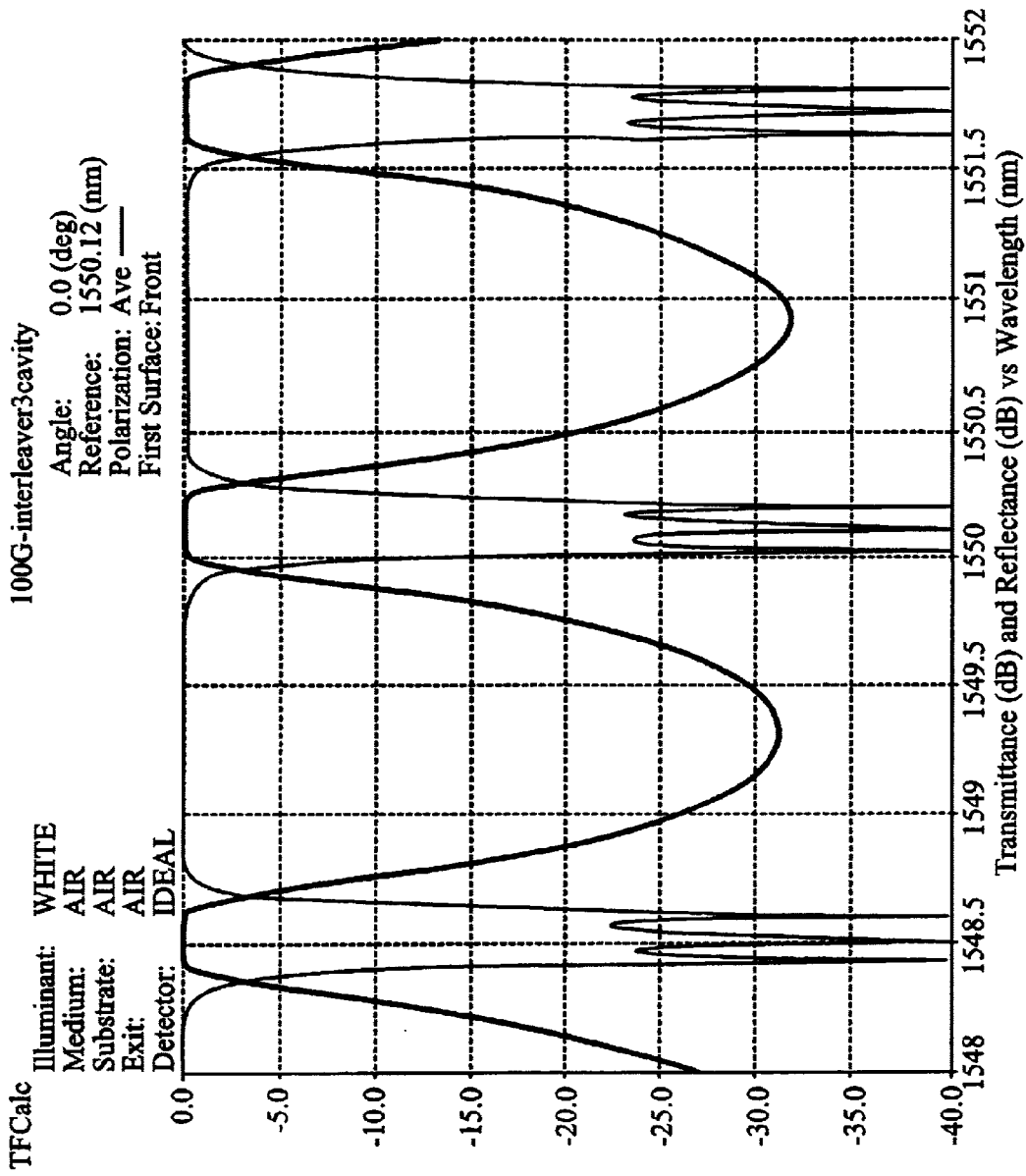
FIG. 16 is a graphical representation of the optical performance of stacked, optically coupled etalons in accordance with a preferred embodiment, produced in the manner described in Example 1, below.

The passband shape of the stacked, optically coupled etalons is shown in FIG. 16. As seen in Table I above and from the wave form shown in FIG. 16, the stacked, optically coupled etalons produced in accordance with this example have good optical performance characteristics and would be suitable for use in an optical element intended for an optical telecommunication system.

Although the present invention has been described above in terms of specific embodiments, it is anticipated that other uses, alterations and modifications thereof will become apparent to those skilled in the art given the benefit of this disclosure. It is intended that the following claims be read as covering such alterations and modifications as fall within the true spirit and scope of the invention.

What is claimed is:

1. An optical element comprising stacked, optically matched and optically coupled etalons, at least one of the optically coupled etalons comprising first and second selectively transparent thin film mirror coatings on opposite first and second surfaces, respectively, of a bulk optic, the bulk optic defining the cavity spacing of the etalon, wherein the bulk optic comprises a monolithic glass body and wherein the bulk optic further comprises a wedge coating overlying the monolithic glass body.

2. The optical element of claim 1, wherein the wedge coating and the monolithic glass body are formed of substantially the same material.

3. The optical element of claim 1, wherein the wedge coating is formed of material comprising substantially same refractive index as material comprising the optically transparent body.

4. The optical element of claim 3, wherein differences in refractive index of the material comprising the wedge coating and the material comprising the optically transparent body is less than about ±0.01.

5. The optical element of claim 1, wherein the wedge coating at its thickest point has a thickness of less than about 100 nm.

6. An optical element comprising stacked, optically matched and optically coupled etalons, at least one of the optically coupled etalons comprising first and second selectively transparent thin film mirror coatings on opposite first and second surfaces, respectively, of a bulk optic, the bulk optic defining the cavity spacing of the etalon, wherein the bulk optic comprises a monolithic glass body and wherein the bulk optic further comprises a thickness-adjustment layer overlying the monolithic glass body.

7. The optical element of claim 6, wherein the thickness-adjustment layer has a substantially uniform thickness greater than 0 and less than 100 microns.

8. The optical element of claim 6, wherein the thickness-adjustment layer and the monolithic glass body are formed of substantially the same material.

9. The optical element of claim 6, wherein the thickness-adjustment layer is formed of material comprising substantially same refractive index as material comprising the optically transparent body.

10. The optical element of claim 9, wherein differences in refractive index of the material comprising the thickness-adjustment layer and the material comprising the optically transparent body is less than about ±0.01.

11. A method of making an optical element, comprising the steps of:
  providing a plurality of optically matched etalons, at least one of the etalons comprising first and second selectively transparent thin film mirror coatings on opposite first and second surfaces, respectively, of a bulk optic, the bulk optic defining the cavity spacing of the etalon, wherein the step of providing a plurality of optically matched etalons comprises forming a coated substrate by depositing at least first and second selectively transparent thin film mirror coatings on opposite surfaces of the bulk optic, wherein the bulk optic comprises a transparent wafer, and wherein the step of providing a plurality of optically matched etalons further comprises depositing a wedge coating on the transparent wafer;
  stacking the etalons so as to optically couple the etalons, and
  dicing the coated substrate into multiple etalons.

12. A method of making an optical element, comprising the steps of:
  providing a plurality of optically matched etalons, at least one of the etalons comprising first and second selectively transparent thin film mirror coatings on opposite first and second surfaces, respectively, of a bulk optic, the bulk optic defining the cavity spacing of the etalon, wherein the step of providing a plurality of optically matched etalons comprises forming a coated substrate by depositing at least first and second selectively transparent thin film mirror coatings on opposite surfaces of the bulk optic, wherein the bulk optic comprises a transparent wafer, and wherein the step of providing a plurality of optically matched etalons further comprises depositing a thickness-adjustment layer of substantially uniform thickness on the transparent wafer;
  stacking the etalons so as to optically couple the etalons, and
  dicing the coated substrate into multiple etalons.

13. A method of making an optical element, comprising the steps of:
  providing a plurality of optically matched etalons, at least one of the etalons comprising first and second selectively transparent thin film mirror coatings on opposite first and second surfaces, respectively, of a bulk optic, the bulk optic defining the cavity spacing of the etalon, wherein the step of providing a plurality of optically matched etalons comprises
  forming the bulk optic by depositing on a transparent wafer at least a wedge coating and a thickness-adjustment layer of substantially uniform thickness,
  then forming a coated substrate by depositing on opposite surfaces of the bulk optic at least first and second selectively transparent thin film mirror coatings;
  stacking the etalons so as to optically couple the etalons; and
  then dicing the coated substrate into multiple etalons.

14. The method of making an optical element in accordance with claim 13, wherein depositing the wedge coating, thickness-adjustment layer, and first and second selectively transparent thin film mirror coatings is performed by physical vapor deposition.

15. The method of making an optical element in accordance with claim 14, wherein depositing the wedge coating, thickness-adjustment layer, and first and second selectively transparent thin film mirror coatings is performed by ion beam sputtering.

16. The method of making an optical element in accordance with claim 13, wherein depositing the wedge coating, thickness-adjustment layer, and first and second selectively transparent thin film mirror coatings is performed by magnetron sputtering.

17. The method of making an optical element in accordance with claim 13, wherein an elongate target is used to deposit the wedge coating.

18. A method of making an optical element, comprising the steps of:
  providing a plurality of optically matched etalons, at least one of the etalons comprising first and second selectively transparent thin film mirror coatings on opposite first and second surfaces, respectively, of a bulk optic, the bulk optic defining the cavity spacing of the etalon, wherein the step of providing a plurality of optically matched etalons comprises:
  forming the bulk optic by sputtering onto a transparent wafer at least a wedge coating while the transparent wafer is held stationary and offset from a sputtering target in a vacuum chamber, and a thickness-adjustment layer of substantially uniform thickness while the transparent wafer is spinning in the vacuum chamber;
  then forming a coated substrate by sputtering onto opposite surfaces of the bulk optic at least first and second selectively transparent thin film mirror coatings;
  stacking the etalons so as to optically couple the etalons; and
  then dicing the coated substrate into multiple etalons.

19. The method of making an optical element in accordance with claim 18, wherein sputtering of the wedge coating and the thickness-adjustment layer is continuous.

20. The method of making an optical element in accordance with claim 18, wherein the wedge coating and thickness adjustment layer are formed of material comprising substantially same refractive index as material comprising the optically transparent body.

21. The method of making an optical element in accordance with claim 20, wherein differences in refractive index of the material comprising the thickness adjustment layer and the material comprising the optically transparent body is less than about ±0.01.

22. The method of making an optical element in accordance with claim 18, wherein the step of providing a plurality of optically matched etalons further comprises depositing a bonding layer onto at least one side of the coated substrate before dicing the coated substrate.

23. The method of making an optical element in accordance with claim 22, wherein the bonding layer is deposited onto the coated substrate, by physical vapor deposition.

24. The method of making an optical element in accordance with claim 22, wherein the bonding layer is deposited onto the coated substrate by sputtering.

25. The method of making an optical element in accordance with claim 22, wherein the bonding layer comprises fritted glass.

26. The method of making an optical element in accordance with claim 18, wherein the step of providing a plurality of optically matched etalons further comprises forming a bonding layer on at least one side of the coated substrate before dicing the coated substrate, by depositing on said one side of the coated substrate a layer of etchable material and then etching away at least one portion of the etchable material to leave stand-offs formed by remaining portions of the etchable material extending from said one side of the coated substrate.

27. The method of making an optical element in accordance with claim 26, wherein the etchable material is fritted glass.

28. The method of making an optical element in accordance with claim 27, further comprising the steps, after stacking the etalons, including at least one etalon having said flitted glass stand-offs, of melting and cooling the fritted glass to attach the at least one etalon to an adjacent surface of another etalon.

29. A method of making an optical element, comprising the steps of:

providing a plurality of optically matched etalons, at least one of the etalons comprising first and second selectively transparent thin film mirror coatings on opposite first and second surfaces, respectively, of a bulk optic, the bulk optic defining the cavity spacing of the etalon, wherein the step of providing a plurality of optically matched etalons comprises forming a coated substrate by depositing at least first and second selectively transparent thin film mirror coatings on opposite surfaces of the bulk optic, wherein the bulk optic comprises a transparent wafer, and stacking the etalons so as to optically couple the etalons,
depositing a transition layer on the first selectively transparent thin film mirror coating;
depositing a first thin film stack on the transition layer;
depositing a first cavity film on the first thin film stack; and
depositing a second thin film stack on the first cavity film, wherein
the first thin film stack, first cavity film, and second thin film stack define a thin film etalon; and dicing the coated substrate into multiple etalons.

30. The method of claim 29, wherein deposition of the thin film etalon occurs continuously after deposition of the selectively transparent thin film mirror coatings.

* * * * *